United States Patent [19]
Fujiwara

[11] Patent Number: 5,755,435
[45] Date of Patent: May 26, 1998

[54] DOCUMENT CONVEYING ARRANGEMENT IN DATA PROCESSING APPARATUS

[75] Inventor: Tatsuo Fujiwara, Kawasaki, Japan

[73] Assignee: Fujitsu Limited, Kanagawa, Japan

[21] Appl. No.: 681,335

[22] Filed: Jul. 23, 1996

[30] Foreign Application Priority Data

Aug. 28, 1995 [JP] Japan ................................. 7-218670

[51] Int. Cl.$^6$ ................................................ B65H 5/22
[52] U.S. Cl. ................ 271/4.04; 271/4.1; 271/10.04; 271/10.05; 271/10.13; 271/116; 271/118
[58] Field of Search ................ 271/3.18, 4.04, 271/4.1, 10.04, 10.05, 10.13, 117, 118, 116, 114, 164

[56] References Cited

U.S. PATENT DOCUMENTS

| | | | |
|---|---|---|---|
| 4,721,297 | 1/1988 | Katayama | 271/10.04 |
| 4,934,686 | 6/1990 | Ono et al. | 271/117 |
| 5,624,109 | 4/1997 | Tanaka | 271/10.13 |
| 5,628,503 | 5/1997 | Ishikawa | 271/10.04 |

FOREIGN PATENT DOCUMENTS

| | | | |
|---|---|---|---|
| 0 621 719 A1 | 10/1994 | European Pat. Off. | |
| 58-148131 | 9/1983 | Japan | 271/117 |
| 401022738 A | 1/1989 | Japan | 271/4.1 |
| 0178127 | 7/1990 | Japan | 271/118 |
| 405092839 A | 4/1993 | Japan | 271/4.04 |

*Primary Examiner*—H. Grant Skaggs
*Attorney, Agent, or Firm*—Armstrong, Westerman, Hattori, McLeland & Naughton

[57] ABSTRACT

A data processing apparatus having an image reading head. A box-shaped casing has upper and lower cavities, with a hopper table slidably arranged in the upper cavity. The lower cavity is a stacker. A pick roller, a separator roller, and conveying rollers are arranged in the hopper table. The rollers are driven by a common motor through a gear train. One-way clutches are incorporated in the gear train so that the pick roller, the separator roller, and the conveying rollers are driven when the motor rotates in a forward direction, and the separator roller and the pick roller are not driven and the conveying rollers are driven when the motor rotates in a reverse direction. The pick roller can be lifted or lowered depending on the rotational direction of the motor.

28 Claims, 18 Drawing Sheets

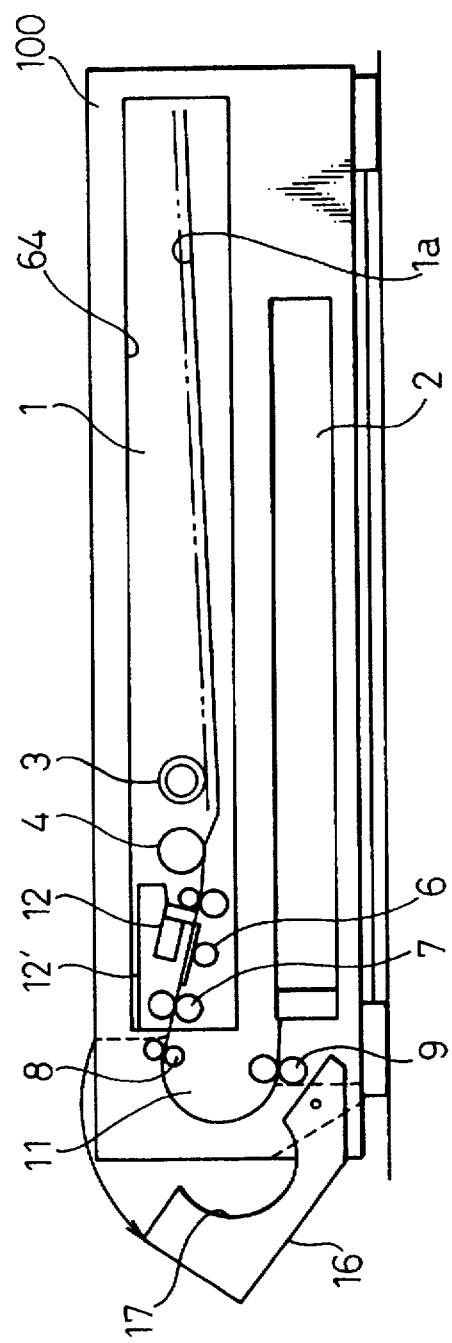

DOCUMENT CONVEYING ARRANGEMENT IN DATA PROCESSING APPARATUS

BACKGROUND OF THE INVENTION

1. Field of the Invention

The present invention relates to a data processing apparatus such as an image reading apparatus or an image forming apparatus or a like device.

2. Prior Art

Conventional image reading apparatuses and conventional printers include sheet conveying mechanisms, which are classified into top sheet picking systems and bottom sheet picking systems. A top sheet picking system allows sheets to be picked up in order from the top to the bottom of the stack of sheets on the hopper, and the bottom sheet picking system allows sheets to be picked up in order from the bottom to the top of the stack of sheets on the hopper. A top sheet picking system is frequently used when the sheet is reversed (the top becomes the bottom) when it is being conveyed, and provides a high conveying capacity because load is not applied to the sheets on the hopper except for the top sheet being picked up. In the top sheet picking system, for example, the documents or the paper sheets stacked on the hopper are picked up by a pick roller, separated one by one by a separator roller if a plurality of sheets are simultaneously picked up, passed through a reading head or a printing head, and conveyed to the stacker.

The pick roller and the separator roller are arranged to contact the upper side of one sheet to feed the sheet to the reading head or to the printing head. It is necessary to stop the rotation of the pick roller and the separator roller while the conveying rollers are rotated after one sheet is fed to the reading head or to the printing head, to avoid allowing a plurality of sheets to be simultaneously conveyed in the conveying path. Also, it is desirable to lift the pick roller after one sheet is fed to the reading head or to the printing head.

Conventionally, electromagnetic clutches or the like are used to turn on and off the operation of the pick roller and the separator roller, and in addition, electromagnetic solenoids are used to lift the pick roller from the stack of documents.

However, the conventional data processing apparatus necessitates a plurality of electromagnetic parts, and a control unit becomes complex and a size of the apparatus becomes large. As a result, a manufacturing cost of the apparatus increases. In addition, a slight delay occurs in controlling the lifting and lowering of the pick roller, and it is disadvantageous, in view of the conveying speed, compared with the bottom sheet picking system.

EP-A1-0621719, filed by the same assignee as for the present case, discloses a data processing apparatus having a box-shaped casing having parallel and horizontal cavities and a hopper table arranged in the upper cavity. The hopper table has a hopper onto which a plurality of sheets can be set and a reading head (or a printing head), and the lower cavity of the casing serves as a stacker. Sheet conveying rollers are arranged for conveying the documents from the hopper through the reading head to the stacker. A plurality of documents can be handled at one time, and yet, the hopper and the stacker do not project from the casing. Therefore, this apparatus is advantageous in that it can be placed in any available small area.

SUMMARY OF THE INVENTION

The object of the present invention is to provide an improved data processing apparatus of the type having a slidable hopper plate.

The object of the present invention is to provide a data processing apparatus having a simple mechanical arrangement to drive and stop a pick roller or the like.

Another object of the present invention is to provide a data processing apparatus having a simple mechanical arrangement to lift and lower a pick roller.

A further object of the present invention is to provide a data processing apparatus having a sheet conveying device by which sheets can be efficiently conveyed irrespective of whether they are fed by a pick roller or conveyed by conveying rollers.

A further object of the present invention is to improve a data processing apparatus having a box-shaped casing and a slidable hopper table.

According to the present invention, there is provided a sheet conveying device comprising: feeding means for feeding a sheet to a sheet conveying path; conveying means for conveying the sheet fed by the feeding means, the conveying means forming with the feeding means the sheet conveying path; an actuator for driving the feeding means and the conveying means; and movement transferring means arranged such that the driving force is transferred from the actuator to the feeding means when the actuator is actuated in a first direction and the driving force is not transferred from the actuator to the feeding means when the actuator is actuated in a second direction, whereby the movement of the feeding means is controlled by controlling the actuating direction of the actuator. Preferably, the data processing means comprises one of a reading head and a printing head.

This arrangement can be arranged purely in a mechanically moved system, and it is only necessary to control the operation of the actuator, with a simple control unit. The number of parts is not increased and it is not necessary to enlarge a size of the conveying device. Therefore, this arrangement is well adapted for use in a data processing apparatus having a box-shaped casing and a slidable hopper table.

The movement transferring means may be arranged such that the driving force is transferred from the actuator to the feeding means and to the conveying means when the actuator is actuated in a first direction and the driving force is not transferred from the actuator to the feeding means but is transferred to the conveying means when the actuator is actuated in a second direction.

In another aspect, a data processing apparatus comprises: a hopper for setting sheets thereon; a stacker; data processing means; a pick roller for picking up the sheet from the hopper to feed it to a sheet conveying path; at least one conveying roller forming with the pick roller a sheet conveying path; a motor for driving the pick roller and the at least one conveying roller; and movement transferring means for transferring the driving force of the motor to the pick roller and the at least one conveying roller, the movement transferring means including at least one one-way clutch for transferring the driving force of the motor to the pick roller or to the at least one conveying roller.

In another aspect, a data processing apparatus comprises: a hopper for setting sheets thereon; a stacker; data processing means; a pick roller for picking up the sheet from the hopper to feed it to a sheet conveying path; at least one conveying roller forming, with the pick roller, a sheet conveying path; a motor for driving the pick roller and the at least one conveying roller; and movement transferring means for transferring the driving force of the motor to the pick roller and the at least one conveying roller, the movement transferring means including at least two one-way clutches arranged such that the driving force is transferred from the motor to the pick roller and to the at least one conveying roller when the motor is actuated in a first direction and the driving force is not transferred from the motor to the pick roller but is transferred to the at least one conveying roller when the actuator is actuated in a second direction.

In a particular form, a data processing apparatus comprises: a casing having a first cavity and a second cavity arranged in a vertically spaced relationship; a hopper table slidably arranged in the first cavity, the hopper table having a hopper for setting sheets thereon; the second cavity being a stacker; data processing means arranged in the hopper table; a pick roller attached to a pick roller shaft for picking up the sheet from the hopper to feed it to a sheet conveying path; a separator roller attached to a separator roller shaft; at least one conveying roller attached to at least one conveying roller shaft and forming with the pick roller and the separator roller the sheet conveying path from the hopper to the stacker; a motor for driving the pick roller, the separator roller and the at least one conveying roller; movement transferring means for transferring the driving force of the motor to the pick roller, the separator roller and the at least one conveying roller; the movement transferring means comprising: first transferring means operably connecting the at least one conveying roller shaft to the motor; a first one-way clutch associated with the first transferring means; second transferring means operably connecting the separator roller shaft to the at least one conveying roller shaft; a second one-way clutch associated with the second transferring means; third transferring means operably connecting the separator roller shaft to the at least one conveying roller shaft; a third one-way clutch associated with the second transferring means and functioning in the opposite sense to the second one-way clutch; fourth transferring means operably connecting the pick roll shaft to the separator roller shaft; and whereby the driving force is transferred from the motor to the separator roller with the pick roller and to the at least one conveying roller when the motor is actuated in a first direction and the driving force is not transferred from the motor to the separator roller with the pick roller but is transferred to the at least one conveying roller when the actuator is actuated in a second direction.

Preferably, the first to third transferring means comprise a gear transferring mechanism, and the fourth transferring means comprises a belt transferring means.

Preferably, the first one-way clutch is arranged between the at least one conveying roller shaft and a gear in the first transferring means, the second one-way clutch is arranged between the separator roller shaft and a gear in the second transferring means, and the third one-way clutch is arranged between the separator roller shaft and a gear in the third transferring means. In this case, the first one-way clutch is arranged on one end of the at least one conveying roller shaft, the second one-way clutch is arranged on one end of the separator roller shaft, and the third one-way clutch is arranged on the other end of the separator roller shaft.

Also, preferably, the at least one conveying roller comprises a plurality of conveying rollers attached to respective conveying roller shafts and interconnected by a further gear transferring mechanism, the first one-way clutch being arranged on one of the conveying roller shafts located near the separator roller.

In a further aspect, the apparatus further comprises means for lifting the pick roller such that the pick roller is lowered when the motor is actuated in the first direction and the pick roller is lifted when the motor is actuated in the second direction.

This lifting means can be used with the previously described arrangement or with the other arrangement. This lifting means can be arranged purely in a mechanically moved system, and it is only necessary to control the operation of the actuator that drives the pick roller and the conveying roll, with a simple control unit. In addition, a delay does not occur when the pick roller is lowered and lifted, and the picking operation can be smoothly carried out.

In a particular form, a data processing apparatus comprises: a casing having a first cavity and a second cavity arranged in a vertically spaced relationship; a hopper table drawably arranged in the first cavity, the hopper table having a hopper for setting sheets thereon; the second cavity being a stacker; data processing means arranged in the hopper table; a pick roller attached to a pick roller shaft for picking up the sheet from the hopper; a separator roller attached to a separator roller shaft; at least one conveying roller attached to at least one conveying roller shaft and forming with the pick roller and the separator roller a sheet conveying path; a motor for driving the pick roller, the separator roller and the at least one conveying roller; movement transferring means for transferring the driving force of the motor to the pick roller, the separator roller and the at least one conveying roller; and a lifting mechanism for the pick roller arranged such that the pick roller is lowered when the motor is actuated in a first direction and the pick roller is lifted when the motor is actuated in a second direction.

Preferably, the lifting mechanism comprises: at least one first arm having a first end attached to the pick roller shaft and a second end attached to the separator roller shaft, the first arm being rotatable about an axis of the separator roller shaft; at least one second arm having a first end engagable with the first arm and a second end attached to a shaft extending parallel to the pick roller shaft, the second arm being rotatable about an axis of the shaft; a first spring for biasing the second arm in a direction in which the second arm is engaged with the first arm and the pick roller is lifted; and means for moving the second arm in a direction in which the second arm is disengaged from the first arm and the pick roller is lowered.

In this case, preferably, the means for moving the second arm comprises: a first gear attached to the separator roller shaft; a second gear attached to the shaft to which the second arm is attached; and a torque limiter arranged on the separator roller shaft, the torque limiter functioning at a certain stop torque when the separator roller shaft rotates in the second direction. At least one of the first and second gears preferably comprises a partially toothed gear. The apparatus further comprises a second spring for biasing the pick roller into contact with a sheet.

In a further aspect, a data processing apparatus comprises: a hopper for setting sheets thereon; a stacker; data processing means; a pick roller for picking up the sheet from the hopper to feed it to a sheet conveying path; at least one conveying roller forming with the pick roller the sheet conveying path from; an actuator for driving the pick roller and the at least one conveying roller; and control means for controlling the actuator so that the actuator is driven at a first speed while the pick roller feeds the sheet and the actuator is driven at a second speed higher than the first speed while the at least one conveying roller conveys the sheet with the pick roller in a non-operative condition.

Therefore, it is possible to control the actuator or the motor in accordance with a load in the document feeding mode in which the pick roller is driven and a load in the document conveying mode in which the pick roller is not driven, so that the actuator is controlled to provide a necessary output torque when the load is greater and to provide a high speed conveying operation when the load is not so great.

Preferably, the actuator is driven in a first direction while the pick roller feeds the sheet and the actuator is driven in a second direction while the at least one conveying roller conveys the sheet with the pick roller in a non-operative condition.

BRIEF DESCRIPTION OF THE DRAWINGS

The other objects and features of the present invention will become more apparent from the following description of the preferred embodiments, with reference to the accompanying drawings, in which:

FIG. 2 is a diagrammatic view of a modified example of the image reading apparatus;

DESCRIPTION OF THE PREFERRED EMBODIMENTS

Figure 1A:
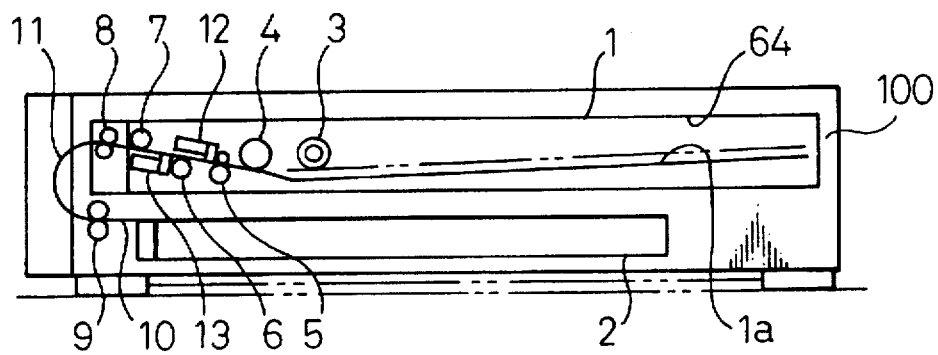
FIG. 1A is a diagrammatic cross-sectional view of the image reading apparatus according to the embodiment of the present invention.
Figure 1B:
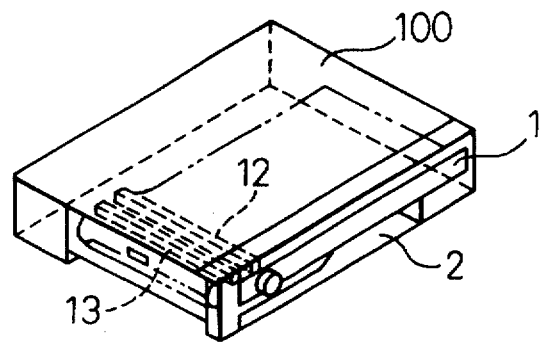
FIG. 1B is a perspective view of the apparatus of FIG. 1A.
Figure 1C:
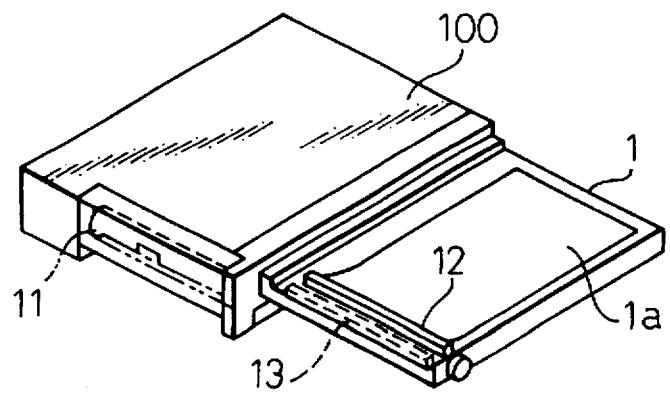
FIG. 1C is a perspective view of the apparatus of FIG. 1A when the hopper table is drawn out.

FIGS. 1A to 1C show an image reading apparatus as an embodiment of a data processing apparatus according to the present invention.

The image reading apparatus has a rigid box-shaped casing 100 which has two wide cavities 64 and 2 in the front of the casing 100 in a vertically spaced relationship. The apparatus includes a front loading type hopper table 1 drawably inserted in the upper cavity 64. The hopper table 1 provides a hopper 1a on which documents or originals to be processed can be set. The hopper table 1 can be pushed into the closed position in the casing 100, as shown in FIG. 1B, and can be pulled forwardly, as shown in FIG. 1C. When the documents are being read or when the apparatus is not in use, the hopper table 1 is brought into the closed position. When documents are to be set on the hopper 1a, the hopper table 1 is brought into the open position.

The lower cavity 2 comprises a stacker into which the documents are successively conveyed and stacked, after they have been read. Hereinafter, the lower cavity 2 is called a stacker. Since the stacker 2 is provided in the lower portion of the apparatus and the stacker 2 is not pulled out, it is possible to place and use any less tall device such as a keyboard or the like in front of the casing 100. It is of course possible to construct a slidable stacker, in a manner similar to the hopper table 1.

Figure 3:
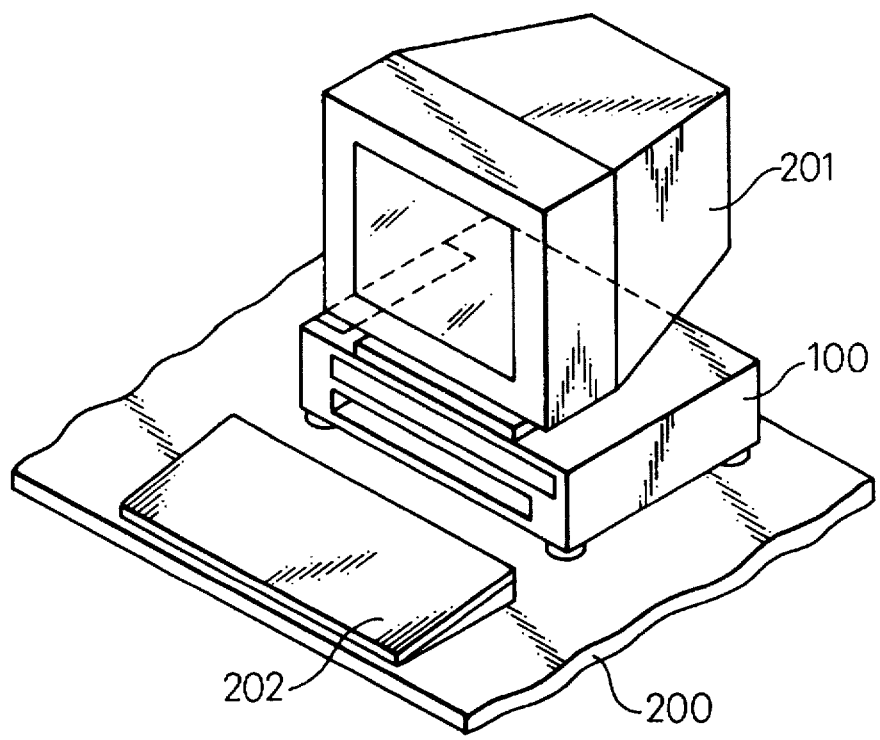
FIG. 3 is a perspective view of the apparatus of FIGS. 1A to 1C and a personal computer placed on the apparatus.

FIG. 3 shows an example of the use of the image reading apparatus of FIGS. 1A to 1C. In FIG. 3, the image reading apparatus casing 100 is placed on a desk 200 and a personal computer 201 or similar is put on the image reading apparatus casing 100 so that space around the image reading apparatus can be effectively utilized. A keyboard 202 is also placed on the desk 200 in front of the image reading apparatus casing 100. The image reading apparatus casing 100 does not have upwardly or laterally projecting members, which may be provided in the ADF (automatic document feeder) type apparatus or a flat bed type apparatus. Therefore, the image reading apparatus of the present invention permits most of the space around it to be effectively used.

The image reading apparatus includes rollers comprising a pick roller 3 for feeding the documents set on the hopper 1a one by one, and a separator roller 4 for preventing a plurality of documents from being fed at one time. A separator pad (not shown) is arranged under the separator roller 4. If a plurality of documents are simultaneously fed along the conveying path, the documents may be jammed or the overlapped portions of documents may not be read. Therefore, when a plurality of the documents are picked up by the pick roller 3, the documents are separated by the separator roller 4 and the separator pad and fed along the conveying path one by one. Frictional force exists among the documents, but the separator roller 4 and the separator pad function to separate the documents based on a difference in the frictional force between the separator roller 4 and the paper, between the paper and the separator pad, and between the papers.

The image reading apparatus also includes conveying rollers 5 to 9. In this embodiment, the conveyer rollers 5 to 7 are mounted to the hopper table 1. Reference numeral 10 denotes a conveying path along which the documents are conveyed, and reference numeral 11 denotes a portion of the conveying path 10 formed in the of a letter U shape. The conveying path 10 is inverted at this U-shaped portion 11. Therefore, the documents can be conveyed from the hopper 1a along the conveying path 10 to the stacker 2. The documents are stacked in the stacker 2 one upon another in the identical order to that on the hopper 1a. Therefore, there is no need to rearrange the order of the documents after they have been read.

Reference numerals 12 and 13 denote first and second reading heads, respectively arranged along the conveying path 10 for reading the documents. The first reading head 12 can read information on the front surface of the document, and the second reading head 13 can read information on the back surface of the document.

FIG. 2 shows a modification of the image reading apparatus, in which only one reading head 12 is arranged. The reading head 12 is incorporated in a head unit 12' which is attached to the hopper table 1. Accordingly, first and second reading heads 12 and 13 can be used when it is desired to read information on both surfaces of one document at a time, but it is sufficient to equip only first reading head 12 alone; when it is desired to read information only on one surface of the document. The conveying roller 6 acts as a platen. The conveying roller 7 also act as a platen when the second reading head 13 is equipped.

The image processing apparatus of the present invention can function as the image reading apparatus, as shown. However, the image processing apparatus of the present invention can also function as a printer. In this case, it is possible to arrange a printing head or printing heads in place of the first reading head 12 or the first and second reading heads 12 and 13, with the other elements for conveying the documents identically arranged to those of the image reading apparatus. The printing head(s) may be any one of known types such as an ink-jet head, a thermal head or an impact head, which can be selected depending upon the size of the apparatus and the printing function. Therefore, the following description is related only to the image reading apparatus having a first reading head 12 in order to avoid repetitive explanation, but it will be appreciated that the description is also applicable to the printer or other like devices.

The pick roller 3, the separator roller 4, some of the conveying rollers (or feed rollers) 5 to 7 and the first reading head 12 are supported on the hopper table 1, and a driving mechanism 20a (FIG. 4) including a motor for driving the rollers, is also supported on the hopper table 1. Therefore, the first reading head 12 is operable and the rollers provided in the hopper table 1 can be driven even when the hopper table 1 is in the open position. Accordingly, the documents set on the hopper 1a can be read even when the hopper table 1 is in the open position.

For example, when the document to be read is too large and the hopper table 1 having the document set therein cannot be inserted into the cavity 64 of the casing 100, it is preferable to read the document with the hopper table 1 in the open position. Also, when the document is too hard or thick and the apparatus may be broken if the document is passed through the U-shaped portion 11 of the conveying path 10 and therefore, it is preferable to read the document with the hopper table 1 in the open position. The casing 100 includes a pivotable side cover 16 which can be opened, as shown in FIG. 2. The side cover 16 includes a curved inner surface 17 which forms the U-turn portion 11. Therefore, when the side cover 16 is in the open position, the document can be conveyed straight through the conveying path from the hopper to the discharge path formed after the side cover 16 is opened.

The side cover 16 can be also used to deal with the jammed documents in the conveying path 10, since it provides for an access to the conveying path 10. It is possible to take out the jammed documents by opening the side cover 16. The image reading apparatus according to the embodiment is formed in a box-like shape and it is difficult to remove the documents if they are jammed in the apparatus. The documents may be damaged if the hopper table 1 is opened when the documents are jammed between the hopper table land the casing 100, and it may become no longer possible to read the documents again if the documents are damaged. The side cover 16 can solve the problem of the jammed documents.

The remaining rollers 8 and 9 are arranged in the casing 100 and can be driven with the rollers 5 to 8 carried by the hopper table 1 when the hopper table 1 is brought into the closed position, whereby the driving force of the motor mounted to the hopper table 1 is transmitted to the roller 9 in the casing 100. A knob 18 (FIG. 4) is provided on the front side of the hopper table, the knob being connected to one of the shafts of the conveying rollers so that the conveying rollers are manually rotated to remove the documents when the documents are jammed.

Figure 4:
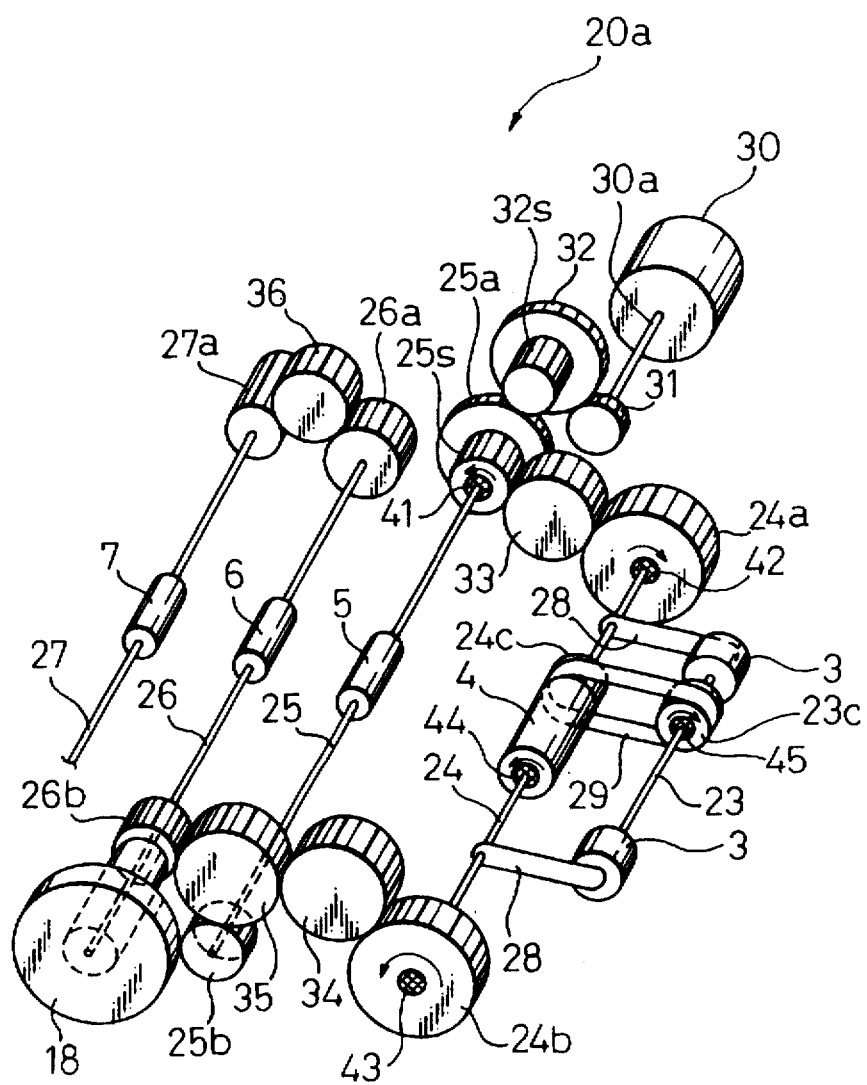
FIG. 4 is a gearing diagram illustrating the gears and clutches of the driving mechanism of the image reading apparatus of FIG. 2.

FIG. 4 is a gearing diagram illustrating the gears and clutches of the driving mechanism 20a of the image reading apparatus of FIG. 2. The pick roller 3 is attached to a pick roller shaft 23. The separator roller 4 is attached to a separator roller shaft 24, and the separator roller shaft 24 has gears 24a and 24b on either end thereof. The first conveying roller 5 is attached to a conveying roller shaft 25, and the conveying roller shaft 25 has gears 25a and 25b on either end thereof. The gear 25a has a smaller diameter portion 25s. The second conveying roller 6 is attached to a conveying roller shaft 26, and the conveying roller shaft 26 has gears 26a and 26b on either end thereof. The knob 18 is attached to the shaft 26. The third conveying roller 7 is attached to a conveying roller shaft 27, and the conveying roller shaft 27 has a gear 27a on one end thereof. For the purpose of clarity, the gears are called right gears or left gears according to the position in FIG. 4.

Arms 28 are attached to the separator roller shaft 24 and are rotatable about the axis of the separator roller shaft 24. The arms 28 support the pick roller shaft 23. The pick roller 3 is connected to the separator roller 4 by a belt 29 extending around a pulley 24c on the separator roller shaft 24 and a pulley 23c on the pick roller shaft 23. Therefore, the pick roller 3 is driven with the separator roller 4, and the pick roller 3 can move up and down so that the pick roller 3 normally contacts the top document of the stack of the documents regardless of the number of the documents on the hopper 1a.

The driving mechanism 20a also includes a motor 30 having a motor shaft 30a. A gear 31 is attached to the motor shaft 30a and connected to the right gear 25a of the first conveying roller 5 via an idler gear 32 having a smaller diameter portion 32s. The right gear 25a is connected to the right gear 24a of the separator roller 4 via an idler gear 33. The left gear 25b of the first conveying roller 5 is connected, on one hand, to the left gear 24b of the separator roller 4 via idler gears 34 and 35, and on the other hand, to the left gear 26b of the second conveying roller 6 via the idler gear 35.

The right gear 26a of the second conveying roller 6 is connected to the right gear 27a of the third conveying roller 7 via an idler gear 37.

The driving mechanism 20a also includes a first one-way clutch 41 arranged between the conveying roller shaft 25 and the right gear 25a thereon so that the first one-way clutch 41 transmits the rotation of the right gear 25a to the conveying roller shaft 25 when the right gear 25a is driven in the counter-clockwise direction, as shown by the arrow in FIG. 4. Therefore, when the right gear 25a is driven in the counter-clockwise direction (referred hereinafter to the reverse direction of the motor), the first to third conveying rollers 5, 6 and 7 are rotated in the identical direction via the conveying roller shafts 25 and 26 and the gears 25b, 35, 26b, 26a, 36 and 27a to convey the documents from the reading head 12 to the stacker 2. The first to third conveying rollers 5, 6 and 7 are arranged below the conveying path 10 and their pinch rollers and the reading head 12 are arranged above the conveying path 10. The pick roller 3 and the separator roller 4 are arranged above the conveying path 10. Therefore, in order to feed or convey the documents, the pick roller 3 and the separator roller 4 are rotated in the clockwise direction, and the first to third conveying rollers 5, 6 and 7 are rotated in the counter-clockwise direction.

The first one-way clutch 41 does not transmit the driving force of the motor 30 to the conveying roller shaft 25 when the right gear 25a is driven in the clockwise direction (referred hereinafter to the forward direction of the motor). In this case, the first to third conveying rollers 5, 6 and 7 are not rotated by the conveying roller shaft 25 due to the rotation of the right gear 25a, but are rotated in a manner described hereinafter.

A second one-way clutch 42 is arranged on the separator roller shaft 24 so that the second one-way clutch 42 transmits the rotation of the right gear 24a to the separator roller shaft 24 when the right gear 24a is driven in the clockwise direction, as shown by the arrow in FIG. 4. Therefore, when the right gear 24a is driven in the clockwise direction (that is, when the motor 30 and the right gear 25a are driven in the clockwise (forward) direction), the separator roller 4 with the pick roller 3 is rotated in the clockwise direction to feed the document from the hopper 1a. The second one-way clutch 42 does not transmit the rotation of the right gear 24a to the separator roller shaft 24 when the right gear 24a is driven in the counter-clockwise direction (reverse direction).

A third one-way clutch 43 is arranged on the other end of the separator roller shaft 24 so that the third one-way clutch 43 transmits the rotation of the left gear 24b to the separator roller shaft 24 when the left gear 24b is driven in the counter-clockwise direction, and does not transmit the rotation of the left gear 24b to the separator roller shaft 24 when the left gear 24b is driven in the clockwise direction. In other words, the third one-way clutch 43 transmits the rotation of the separator roller shaft 24 to the left gear 24b when the separator roller shaft 24 is driven in the clockwise direction and the third one-way clutch 43 does not transmit the rotation of the separator roller shaft 24 to the left gear 24b when the separator roller shaft 24 is driven in the counter-clockwise direction.

A fourth one-way clutch 44 is also arranged between the separator roller shaft 24 and the separator roller 4 so that the separator roller 4 does not rotate relative to the separator roller shaft 24 when the separator roller shaft 24 is driven in the counter-clockwise direction. A fifth one-way clutch 45 is also arranged between the pick roller shaft 23 and the pulley 23c.

Figure 5:
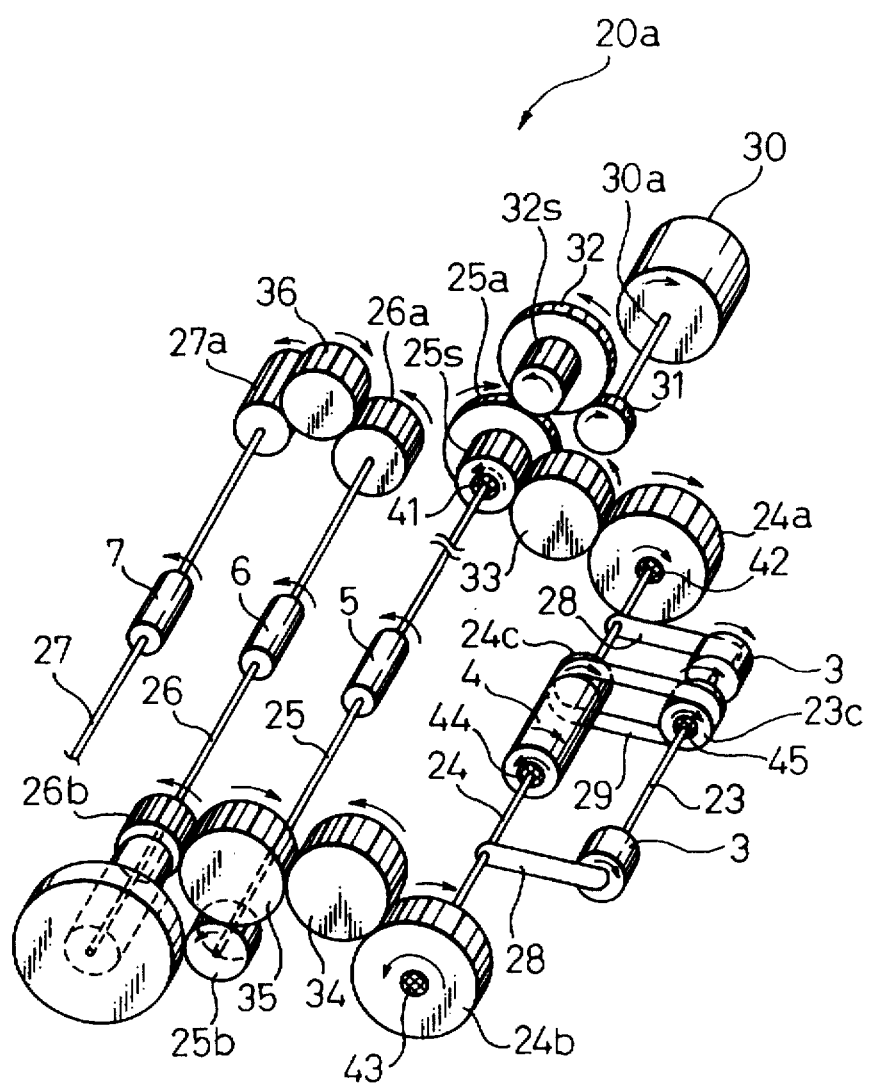
FIG. 5 is a gearing diagram of the driving mechanism of FIG. 4 in the paper feeding mode.
Figure 6:
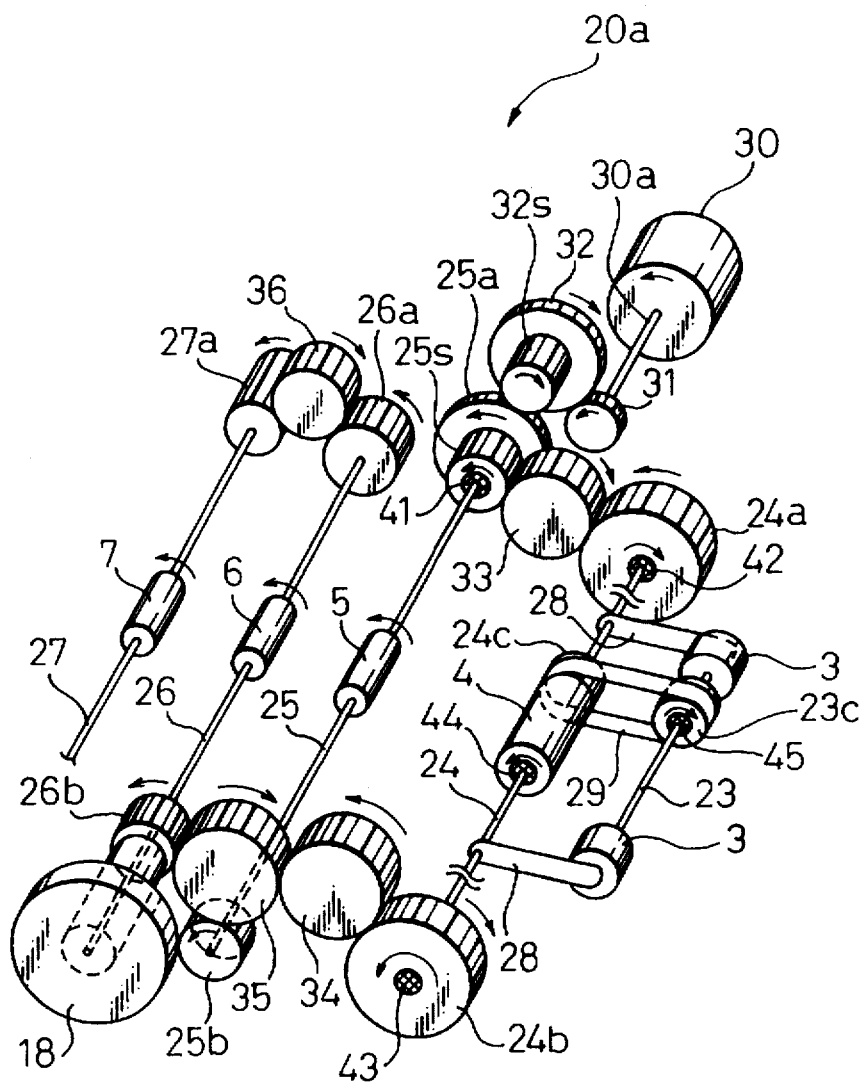
FIG. 6 is a gearing diagram of the driving mechanism of FIG. 4 in the paper conveying mode.
Figure 7:
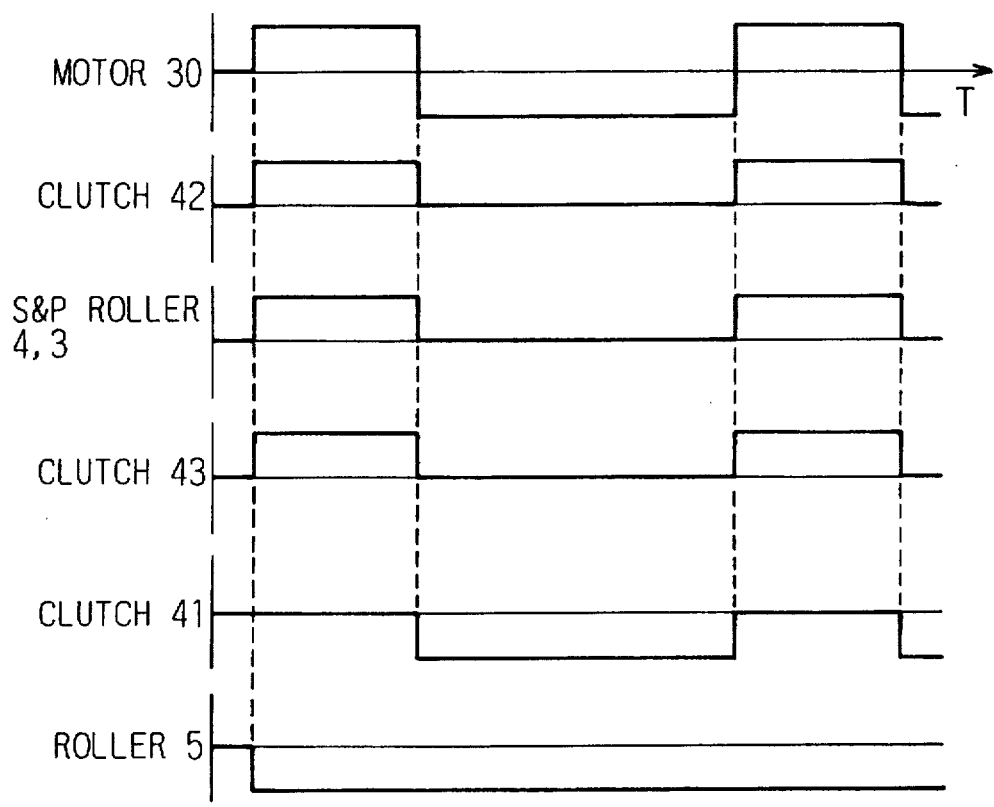
FIG. 7 is a timing chart for illustrating the operation of the apparatus of FIGS. 2 and 4 to 6.

FIG. 5 shows the driving mechanism 20a in the paper feeding mode, and FIG. 6 shows the driving mechanism 20a in the paper conveying mode. In these figures, a solid line arrow shows that the one-way clutch is transmitting movement and a broken line arrow shows that the one-way clutch is not transmitting the movement. FIG. 7 shows the operation of several elements of the driving mechanism 20a, in which the forward rotation of each member is shown above the horizontal axis and the reverse rotation of each member is shown below the horizontal axis.

In FIGS. 5 and 7, when the document on the hopper 1a is to be fed, the motor 30 is driven in the forward direction. The right gear 25a on the conveying roller shaft 25 is thus rotated in the forward direction, and the right gear 24a on the separator roller 4 is thus rotated in the forward direction, with the result that the second one-way clutch 42 transmits the rotation of the right gear 24a to the separator roller shaft 24. The separator roller 4 and the pick roller 3 are thus rotated in the forward direction to pick up the document from the hopper 1a to feed it to the conveying path 10. The first one-way clutch 41 does not transmit the rotation of the gear 25a to the conveying roller shaft 25, so the first to third conveying rollers 5 to 7 are not driven by the conveying roller shaft 25 due to the rotation of the right gear 25a. However, the rotation of the gear 24a on the separator roller shaft 24 in the clockwise direction is transmitted to the left gear 24b by the separator roller shaft 24 and the third one-way clutch 43, and further, from the left gear 24b to the left gear 25b via the idler gears 34 and 35. The conveying roller shaft 25 is thus rotated. Accordingly, the first to third conveying rollers 5 to 7 are driven in the counter-clockwise direction to convey the document. Therefore, in the feeding mode, the document is picked up from the hopper 1a and conveyed by the conveying rollers 5 to 7.

In FIGS. 6 and 7, while the separator roller 4 and the pick roller 3 are stopped, the document is further conveyed. For this purpose, the motor 30 is driven in the reverse direction, and the right gear 25a on the conveying roller shaft 25 is rotated in the reverse direction, so the first one-way clutch 41 transmits the rotation of the gear 25a to the shaft 25, with the result that the first to third conveying rollers 5 to 7 are driven to convey the document. In this case, the right gear 24a on the separator roller shaft 24 is rotated in the reverse direction and the second one-way clutch 42 does not transmit the rotation of the right gear 24a to the separator roller shaft 24, so the separator roller 4 and the pick roller 3 do not rotate. In addition, the left gear 24b on the separator roller shaft 24 is rotated in the clockwise direction through the conveying roller shaft 25 and the gears 25b, 35, and 34 but the third one-way clutch 43 does not transmit the rotation of the left gear 24b to the separator roller shaft 24. Therefore, in the normal conveying mode, the separator roller 4 and the pick roller 3 are not driven.

In this way, according to the present invention, it is possible to control the rotation of the separator roller 4 and the pick roller 3 by changing the rotational direction of the motor 30. The change of the driving condition is carried out by the actions of one-way clutches, and it is not necessary to use electromagnetic clutches which may be conventionally used and which are large in size and expensive. It is also possible to reduce the number of the parts of the apparatus and to improve a complicated control since only one motor 30 is used for selectively driving the separator roller 4 and the pick roller 3, and the conveying rollers 5 to 7.

Gears are used for transmitting the driving force of the motor 30 to the rollers in the embodiment. However, it is possible to use other movement transmitting means such as timing belts and pulleys or the like.

Figure 8:
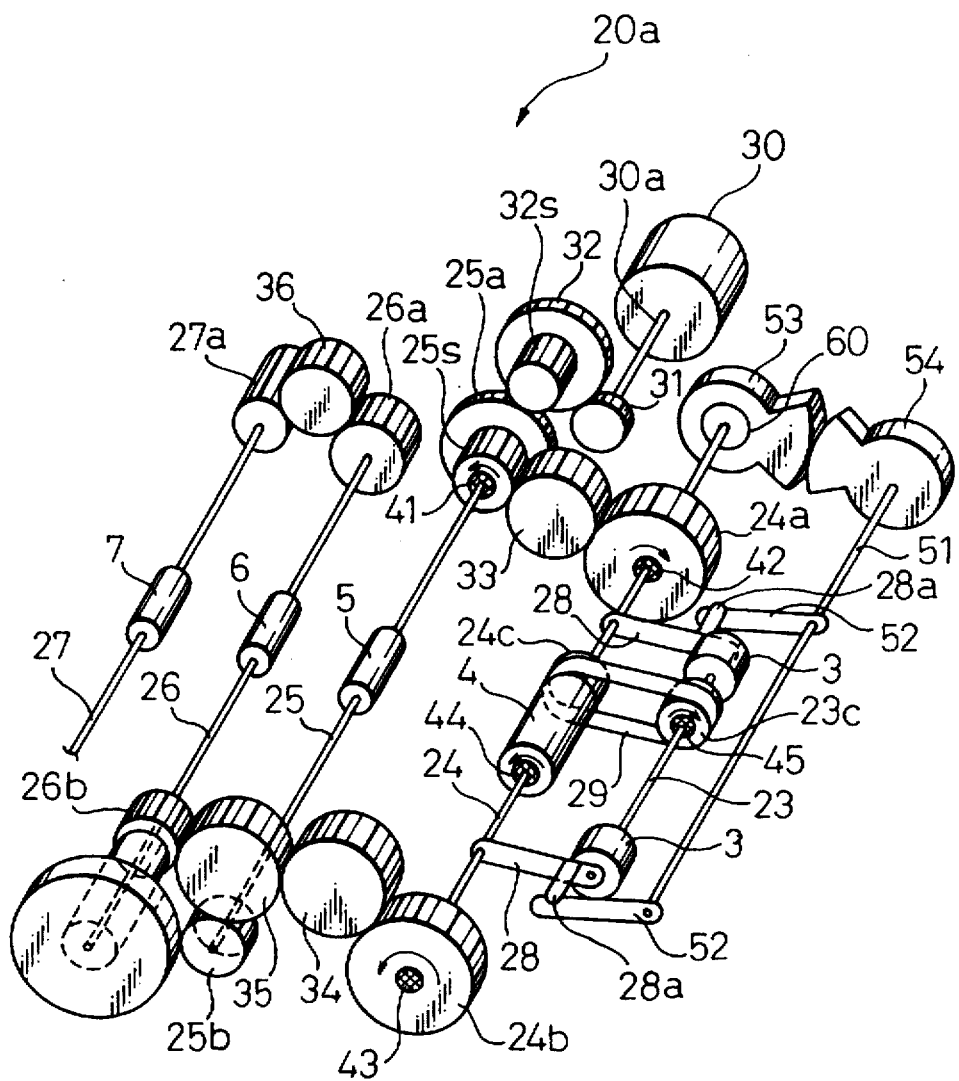
FIG. 8 is a gearing diagram of another example of the driving mechanism.
Figure 9A:
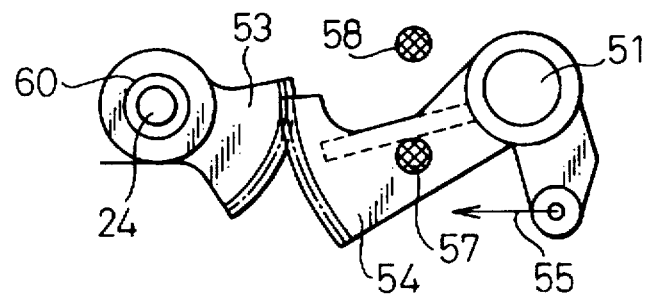
FIG. 9A is a front view of the gears of FIG. 8 when the pick roller is in the lowered position.
Figure 9B:
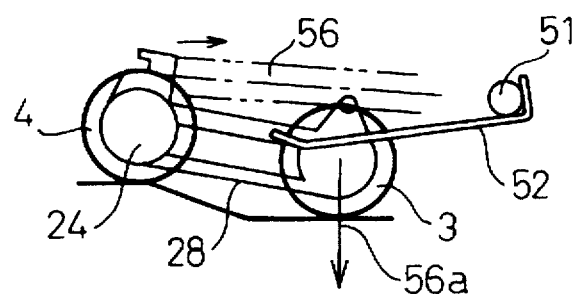
FIG. 9B is a front view of the pick roller and the separator roller when the gears are in the position of FIG. 9A.
Figure 9C:
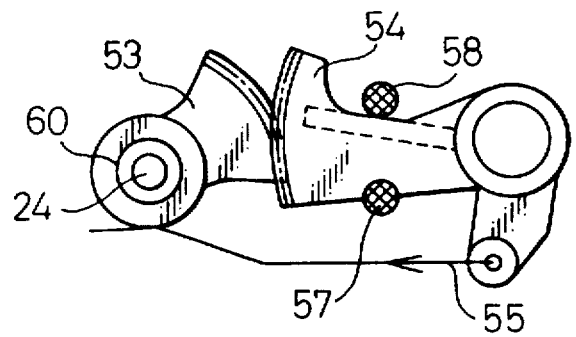
FIG. 9C is a front view of the gears of FIG. 9A when the pick roller is in the lifted position.
Figure 9D:
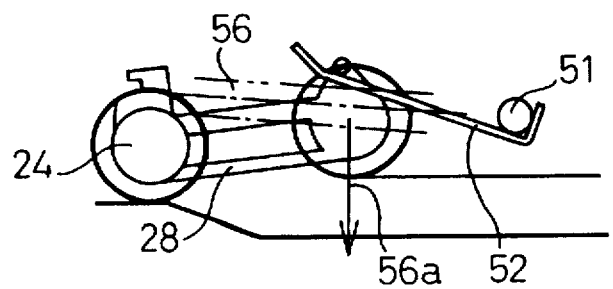
FIG. 9D is a front view of the pick roller and the separator roller when the gears of FIG. 9C are in the position of FIG. 9C.

FIGS. 8 to 9D show another embodiment of the driving mechanism 20a of the image reading apparatus. The elements identical to those of FIGS. 4 to 6 are shown by the identical reference numerals, and the repetitive explanation is avoided. In this embodiment, means for lifting the pick roller 3 is provided, in addition to the above described movement transmission mechanism.

Arms 28 are attached to the separator roller shaft 24 and are rotatable about the axis of the separator roller shaft 24, to support the pick roller 3, similar to the previous embodiment. The pick roller 3 is connected to the separator roller 4 by the belt 29 running around the pulleys 24c and 23c. Therefore, the pick roller 3 can be rotatable with the separator roller 4, and the pick roller 3 can move up and down according to the rotational direction of the separator roller shaft 24. Each of the arms 28 has a projection or lateral extension 28a.

Additional arms 52 are attached to a shaft 51 extending parallel to the separator roller shaft 24. The lateral extensions 28a of the arms 28 are rested against the additional arms 52. A gear 53 is attached to one end of the separator roller shaft 24, and a gear 54 is attached to one end of the additional shaft 51. The gears 53 and 54 are engaged with each other.

FIG. 9A is a front view of the gears 53 and 54 when the pick roller 3 is in the lowered position, and FIG. 9B is a front view of the pick roller 3 and the separator roller 4 when the gears 53 and 54 are in the position of FIG. 9A. FIG. 9C is a front view of the gears 51 and 52 when the pick roller 3 is in the lifted position, and FIG. 9D is a front view of the pick roller 3 and the separator roller 4 when the gears 53 and 54 are in the position of FIG. 9C.

The gear 53 has an inner cylindrical portion and an arcuate toothed portion on the inner cylindrical portion. The axis of the inner cylindrical portion coincides with the axis of the separator roller shaft 24. The gear 53 has an inner cylindrical portion and an arcuate toothed portion on the inner cylindrical portion. The axis of the inner cylindrical portion coincides with the axis of the additional shaft 51. The shape of the gears 53 and 54 is not limited to the illustrated one, but it is possible to use other shapes. A torque limiter 60 is attached to the shaft 24, so that the gear 53 can rotate with the separator roller shaft 24 up to a limited degree, when the separator roller shaft 24 rotates in the clockwise direction in FIG. 9A. The torque limiter 60 does not function so that the gear 53 is free when the separator roller shaft 24 is not rotating or rotates in the counter-clockwise direction. The gear 54 is biased by a spring (shown by the arrow 55 in FIGS. 9A and 9C) in the clockwise direction in FIG. 9A, and the separator roller 4 is biased by a spring 56 to bias the pick roller 3 in the direction of the arrow 56a so that the pick roller 3 can always contact the documents to reliably feed the documents. If the pick roller 3 has a sufficient weight to stably contact and feed the documents, the spring 56 may be omitted. In addition, stoppers 57 and 58 are arranged to limit the rotational movement of the gear 54. The stopper 57 limits the rotational movement of the gear 54 in the counter-clockwise direction and the stopper 58 limits the rotational movement of the gear 54 in the clockwise direction.

Figure 10:
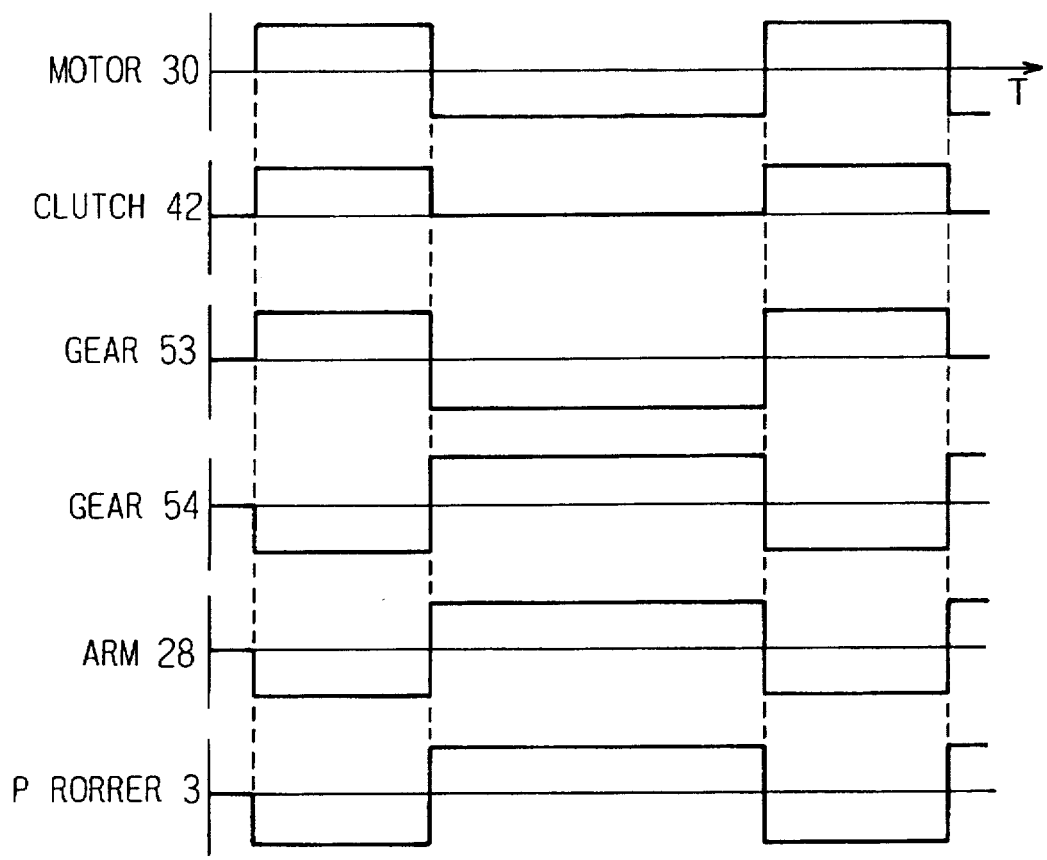
FIG. 10 is a timing chart for illustrating the operation of the apparatus of FIGS. 8 and 9A through 9D.

FIG. 10 shows the operation of the second embodiment of the driving mechanism 20a. The operation of the gears 53 and 54 for lifting and lowering the pick roller 3 is now described with reference to FIGS. 8 to 10.

When the motor 30 is rotated in the forward direction, the rotation of the right gear 24a is transmitted to the conveying roller shaft 24, so that the gear 53 attached to the separator roller shaft 24 starts to rotate in the forward direction according to the action of the torque limiter 60. The gear 54 engaged with the gear 53 thus rotates in the reverse direction against the force of the spring 55, and the arms 52 are lowered. The arms 28 are no longer supported by the arms 52 and are lowered by the force of the spring 58 and/or weight until the pick roller 3 contacts the top document of the stack of the documents on the hopper 1a. The separator roller 4 and the pick roller 3 rotate with the shaft 24, and one document is picked up from the hopper 2a and fed to the reading head 12. The conveying rollers 5, 6 and 7 are also driven by the action of the one-way clutch 43, as described above. The rotation of the gears 53 and 54 are limited at the position of FIGS. 9A and 9B by the action of the torque limiter 60 and the stopper 57.

When the motor 30 is rotated in the reverse direction, the rotation of the right gear 24a is not transmitted to the separator roller shaft 24 by the one-way clutch 42. In this case, the torque limiter 60 allows the gear 53 to freely rotate so the gear 54 can rotate in the forward direction by the force of the spring 55. The arms 52 rotate with the gear 54 to lift the arms 28, to thereby lift the pick roller 3 from the document, as shown in FIGS. 9C and 9D.

When the motor 30 stops, the separator roller shaft 24 does not rotate. Therefore, the torque limiter 60 allows the gear 53 to freely rotate and the gear 54 is biased by the spring 55 in the forward direction. Therefore, the pick roller 3 is lifted or maintained in the lifted position. Therefore, when the user sets the documents on the hopper 1a, the pick roller 3 does not obstruct the document setting operation.

The following relationship exists in the system. Here, constants of the system are selected, as follows:

$T_{TL}$: stop torque of torque limiter $W_{PR}$: load of pick roller 3 (weight+force of spring 56)

$L_L$: length of arm 52 from axis of shaft 51 to acting point $L_{SP}$: length of portion of gear 54 from axis of shaft 51 to acting point of spring 55

$F_{SP}$: tensile force of spring 55

$\Gamma_G$: radius of pitch circle of gear 53

$\Gamma_L$: radius of pitch circle of gear 54

The degree of rotation of the gears 53 and 54 is relatively small, and the following relationships exist approximately.

Regarding the relationship for lifting the pick roller 3, $$W_{PR} \times L_L < F_{SP} \times L_{SP}$$

Regarding the relationship for lowering the pick roller 3, $$T_{TL}/\Gamma_G > (F_{SP} \times L_{SP})/\Gamma_L$$

By satisfying these relationships, it is possible to lower the pick roller 3 by rotating the right gear 24a in the clockwise direction, and to lift the pick roller 3 by rotating the right gear 24a in the counter-clockwise direction.

In this way, according to the present invention, it is possible to control the lowering and lifting of the pick roller 3 by changing the rotational direction of the roller driving motor 30 and the action of the one-way clutch 42. It is not necessary to use expensive electro-magnetic clutches or electromagnetic solenoids. Accordingly, it is possible to obtain a relatively simple arrangement to control the lowering and lifting of the pick roller 3 simultaneously with the turning on and off the pick roller 3 and the separator roller 4. In addition, a delay does not occur when lowering and lifting the pick roller 3, and the picking operation can be smoothly carried out. In addition, it is not necessary to provide separate means to control the lowering and lifting the pick roller 3 and to the control the turning on and off the pick roller 3 and the separator roller 4, since these controls are carried out by changing the rotational direction of the common motor 30. Therefore, it is possible to realize a simpler control.

Figure 11:
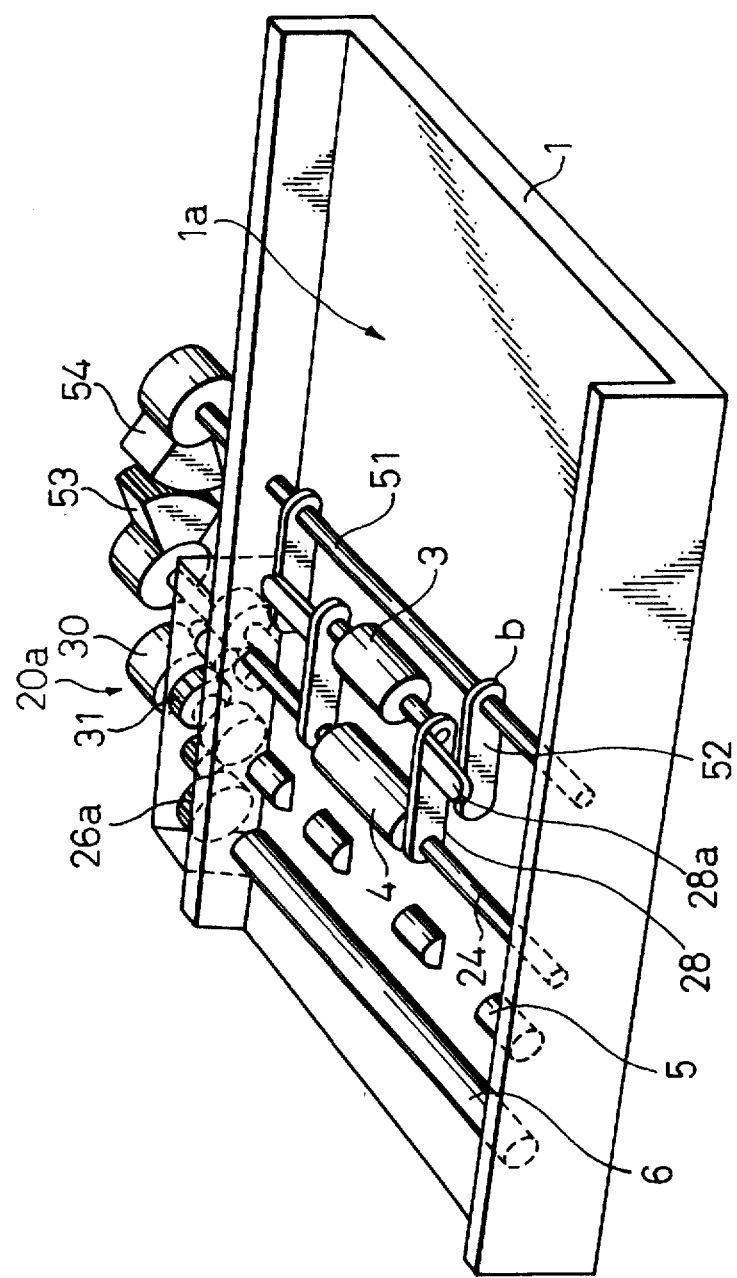
FIG. 11 is a perspective view of the hopper table having the driving mechanism of FIG. 8.

FIG. 11 shows the hopper table 1 having the rollers 3 to 7, the driving mechanism 20a, and the gears 53 and 54 for lowering and lifting the pick roller 3. The roller 7 and the gears on the front side of the hopper table 1 are omitted in FIG. 11. The conveying rollers 5 and 6 are arranged in the hopper table 1 so that portions of the conveying rollers 5 and 6 are embedded in the base of the hopper plate 1, and the pick roller 3 and the separator roller 4 are arranged above the base of the hopper plate 1. The gears 53 and 54 are arranged on the rear of the hopper table 1 so that these gears do not interfere with the motor 30 and the other gears. The motor 30 and the gears for driving the rollers 3 to 7 are attached to the hopper table 1, and it is possible to feed and convey the documents on the hopper 1a, regardless of whether the hopper table 1 is opened or closed.

Figure 12:
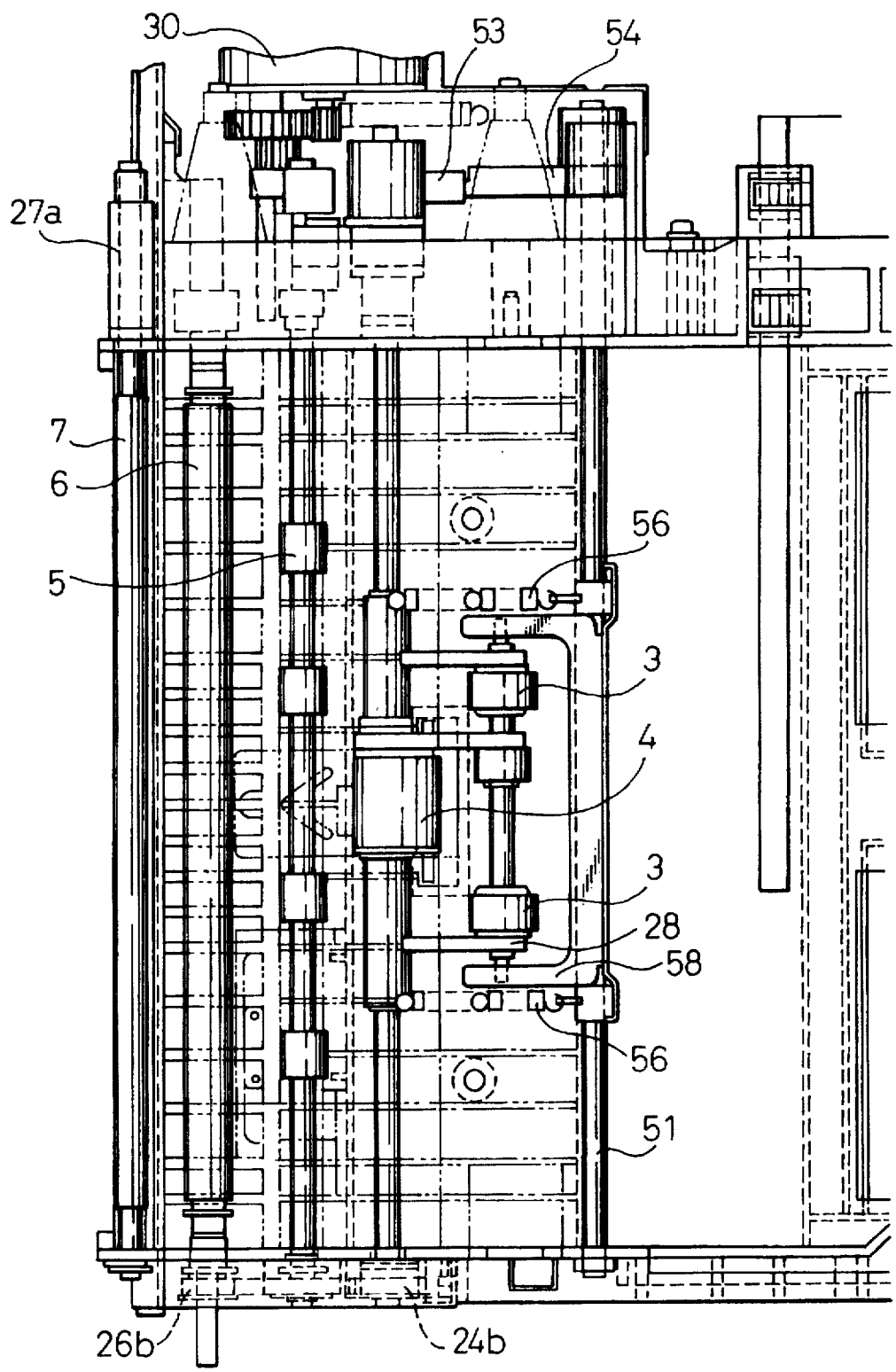
FIG. 12 is a plan view of the hopper table of FIG. 11 in an actual form.
Figure 13:
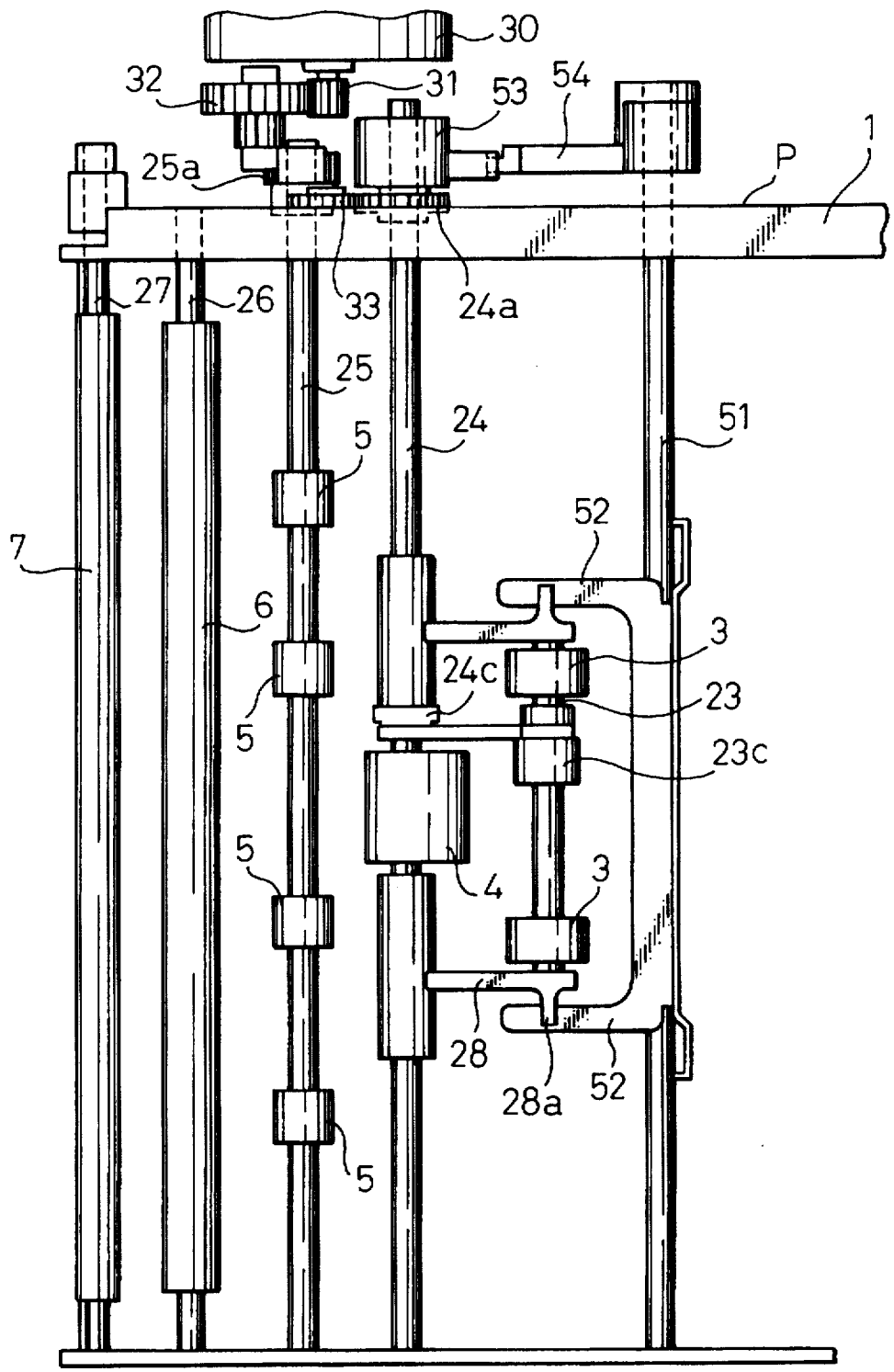
FIG. 13 is a plan view of the simplified hopper table of FIG. 12 with several elements extracted from FIG. 12.

FIG. 12 is a plan view of the hopper table 1. FIG. 13 is a plan view of the hopper table 1, extracting the rollers, the gears and the motor 30 from FIG. 12. The rollers, the gears and the motor 30 are arranged in correspondence with those of FIGS. 8 to 11. The third conveying roller 7 is shown in FIGS. 12 and 13. Also, the gears are shown on the front and rear sides of the hopper table 1 in FIG. 12.

Figure 14:
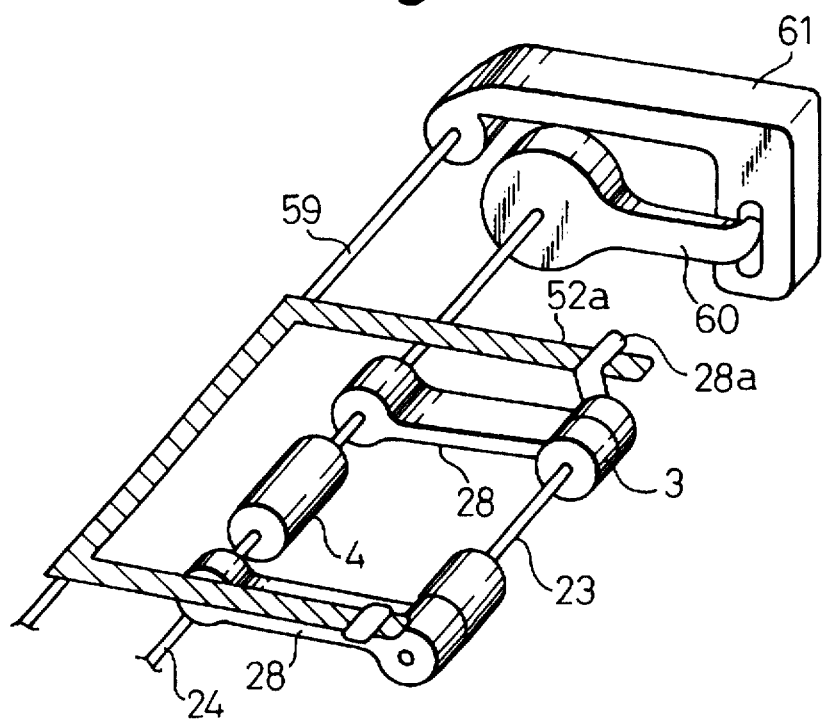
FIG. 14 is a perspective view of the image reading apparatus having the modified pick roller lifting mechanism.

FIG. 14 is a perspective view of the image reading apparatus having the modified pick roller lifting mechanism. The separator roller shaft 24 supports the separator roller 4 and the pick roller shaft 23 supports the pick roller 3. The arms 28 are rotatably attached to the separator roller shaft 24 and support the pick roller shaft 23. Gears 24a and 24b are attached to the separator roller shaft 24 via the one-way clutches 42 and 43 (not shown in FIG. 14), and the pick roller 3 is operatively connected to the separator roller 4 by the pulley and the belt (not shown in FIG. 14), similar to the previous embodiments. Arms 52a are attached to an additional shaft 59, and the lateral extensions 28a of the arms 28 of the pick roller 3 are rested against the arms 52a.

In the embodiment of FIG. 14, the additional shaft 59 and the arms 52a are arranged on the side of the separator roller 4 from the pick roller 3. Therefore, it is possible to reduce the length of the hopper table 1 in the conveying direction. In contrast, the additional shaft 51 and the arms 52 are arranged on the opposite side of the separator roller 4 from the pick roller 3 in the embodiment of FIG. 8, and in this case, the length of the hopper table 1 in the conveying direction may become longer.

In FIG. 14, the torque limiter 60 is attached to one end of the separator roller shaft 24, and an actuator 61 is attached to the additional shaft 59. The torque limiter 60 has a finger-like engaging member and the actuator 61 has an opening in which the engaging member is engaged. The actuator 61 is rotatable with the additional shaft 59, and is biased by a not shown spring in the counter-clockwise direction. When the right gear 24a is rotated in the clockwise direction in FIG. 14, the torque limiter 60 is rotated in the clockwise direction. As a result, the actuator 61 is rotated in the clockwise direction and the arms 52a are lowered, so that the arms 28 can freely move down and the pick roller 3 contacts the document under the pressure of the biasing spring or its own weight. The rotation of the separator roller shaft 24 is transferred to the pick roller 3 via the pulleys and the belt to pick up the document one by one.

When the right gear 24a is rotated in the counter-clockwise direction, the separator roller shaft 24 is not driven by the one-way clutch 42 and the torque limiter 60 does not rotate. The actuator 61 is biased in the counter-clockwise direction by the not shown spring and rotates in the counter-clockwise direction with the additional shaft 59. The torque limiter 60 does not resist this movement. Therefore, the arms 52a lift the arms 28 to lift the pick roller 3 from the document. The pick roller 3 and the separator roller 4 do not rotate.

Figure 15:
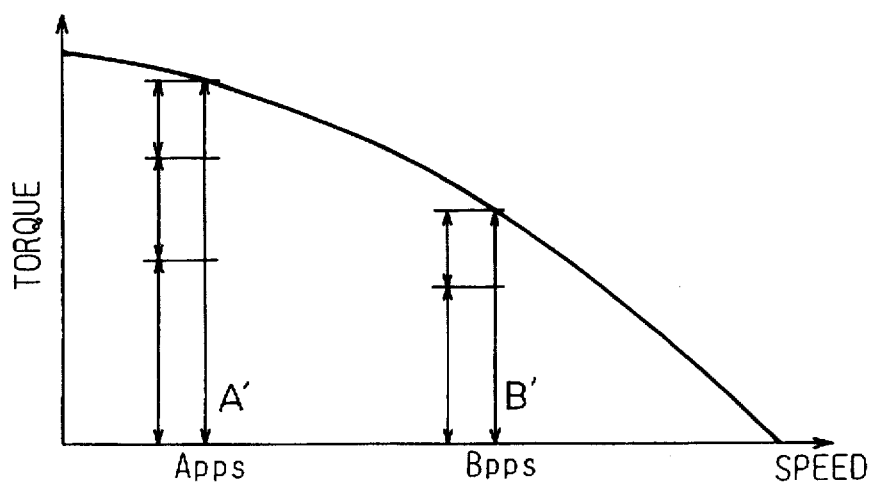
FIG. 15 is a view illustrating the relationship between the speed of the stepped motor and its output torque.

FIG. 15 shows the relationship between the speed and the output torque of a stepped motor which can be used as the motor driving motor 30. The output torque of the stepped motor decreases as the speed thereof increases, and the output torque is relatively high when the motor is used at a lower speed, as shown.

In the data processing apparatus, a relatively higher load is applied to the driving mechanism 20a when the document is picked up by the pick roller 3 and fed to the reading head (or printing head ) 12, especially when the distance between the hopper 1a to the reading head 12 is short. On the other hand, a relatively lower load is applied to the driving mechanism 20a when the document is conveyed by the conveying rollers 5 to 7 (and 8 and 9) after the pick roller 3 and the separator roller 4 are stopped. Therefore, according to the present invention, the motor 30 is controlled so that the rotational speed of the motor 30 is changed between the document feeding mode and the document conveying mode. That is, the motor 30 is driven with a first speed in the feeding mode at which a relatively higher load is applied, and the motor 30 is driven with a second speed higher than the first speed in the conveying mode at which a relatively lower load is applied.

Figure 16:
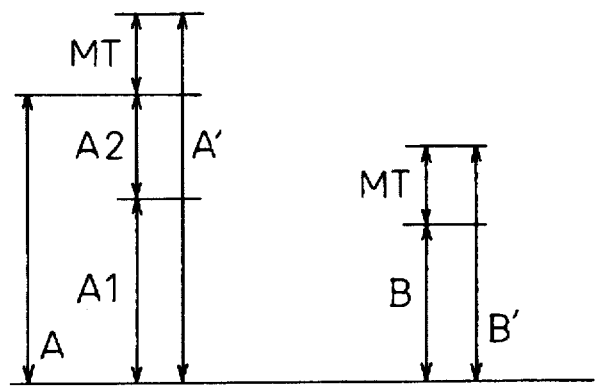
FIG. 16 is a view illustrating the output torques calculated from the loads applied in the feeding mode and in the conveying mode.

"Apps" in FIG. 15 shows the speed of the motor 30 in the feeding mode, and "Bpps" shows the speed of the motor 30 in the conveying mode. FIG. 16 shows the detail of the torque in the feeding mode and in the conveying mode. The load A, applied in the feeding mode, is the sum of the load A1, applied to the conveying part, including the conveying rollers 5 to 7, for example, and the load A2, applied to the feeding part, including the pick roller 3 and the torque limiter 60, for example. The load B applied in the conveying mode is only the load applied to the conveying part, which is lower than the load A1 applied to the conveying part in the feeding mode.

By giving a constant margin torque MT, it is possible to calculate necessary output torques A' and B' of the motor 30 in the feeding mode and in the conveying mode. Therefore, it is possible to obtain the rotational speeds Apps and Bpps of the motor 30, by inserting the output torques A' and B' into the curve of FIG. 15.

Figure 17:
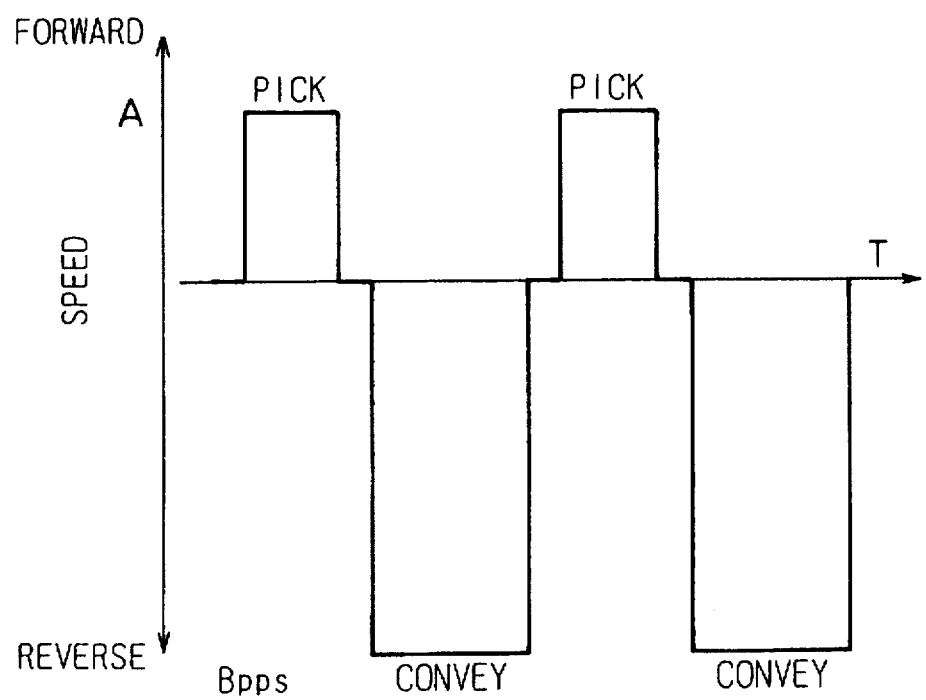
FIG. 17 is a view illustrating the control of the motor.

FIG. 17 shows the control of the motor 30. The horizontal axis shows the time and the vertical axis shows the torque. The motor 30 is driven in the forward direction in the feeding mode, and in the reverse direction in the conveying mode, as shown. The speed of the motor 30 is lower in the feeding mode, and higher in the conveying mode.

A time period during which the motor 30 is driven in the forward direction (the feeding mode) and a time period during which the motor 30 is driven in the reverse direction (the conveying mode) are appropriately determined depending on the length of the feeding part, the length of the conveying path, and the time needed for feeding the document. It is possible to increase the throughput of the document conveying device and to realize a high speed convoying operation, by determining the speed of the motor 30 in this way.

Figure 18A:
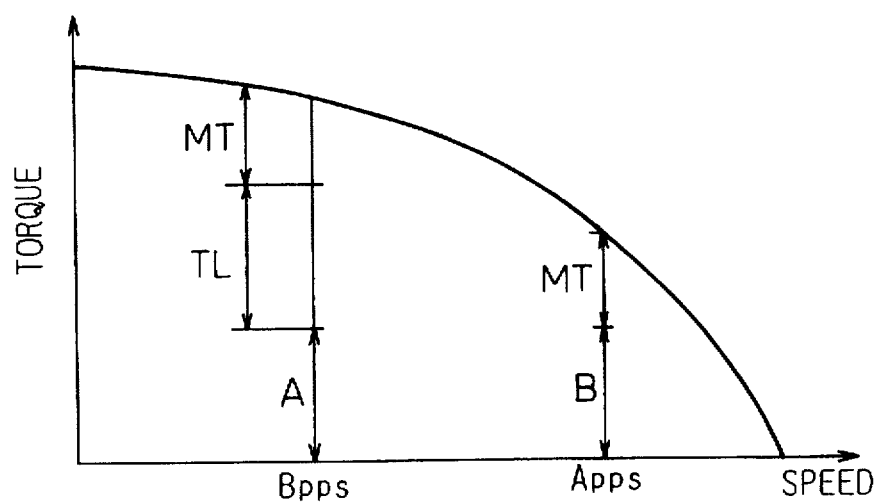
FIG. 18A is a view illustrating another example of the output torques.
Figure 18B:
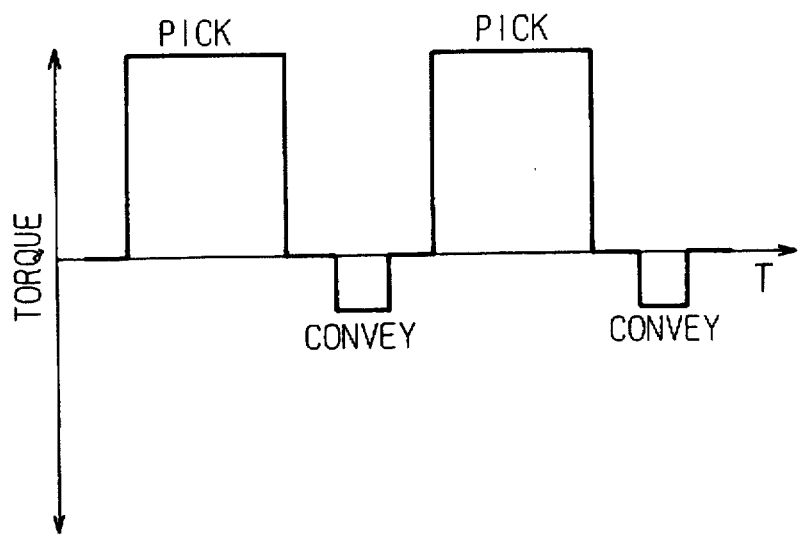
FIG. 18B is a view illustrating the control of the motor of FIG. 18A.

FIGS. 18A and 18B show another example of the motor control. The width of the data processing head (reading head 12) is relatively small and the length of the feeding part is relatively large within the total length of the conveying path. Therefore, the load TL of the torque limiter 60 is relatively large, and it takes a longer time for the document to pass through the data processing head. In this case, the motor 30 is controlled so that the feeding time period is longer and the conveying time period is shorter. It is possible to increase the throughput of the document conveying device, by controlling the motor 30 in this way depending on the feature of the load and the length of the feeding part.

Figure 19:
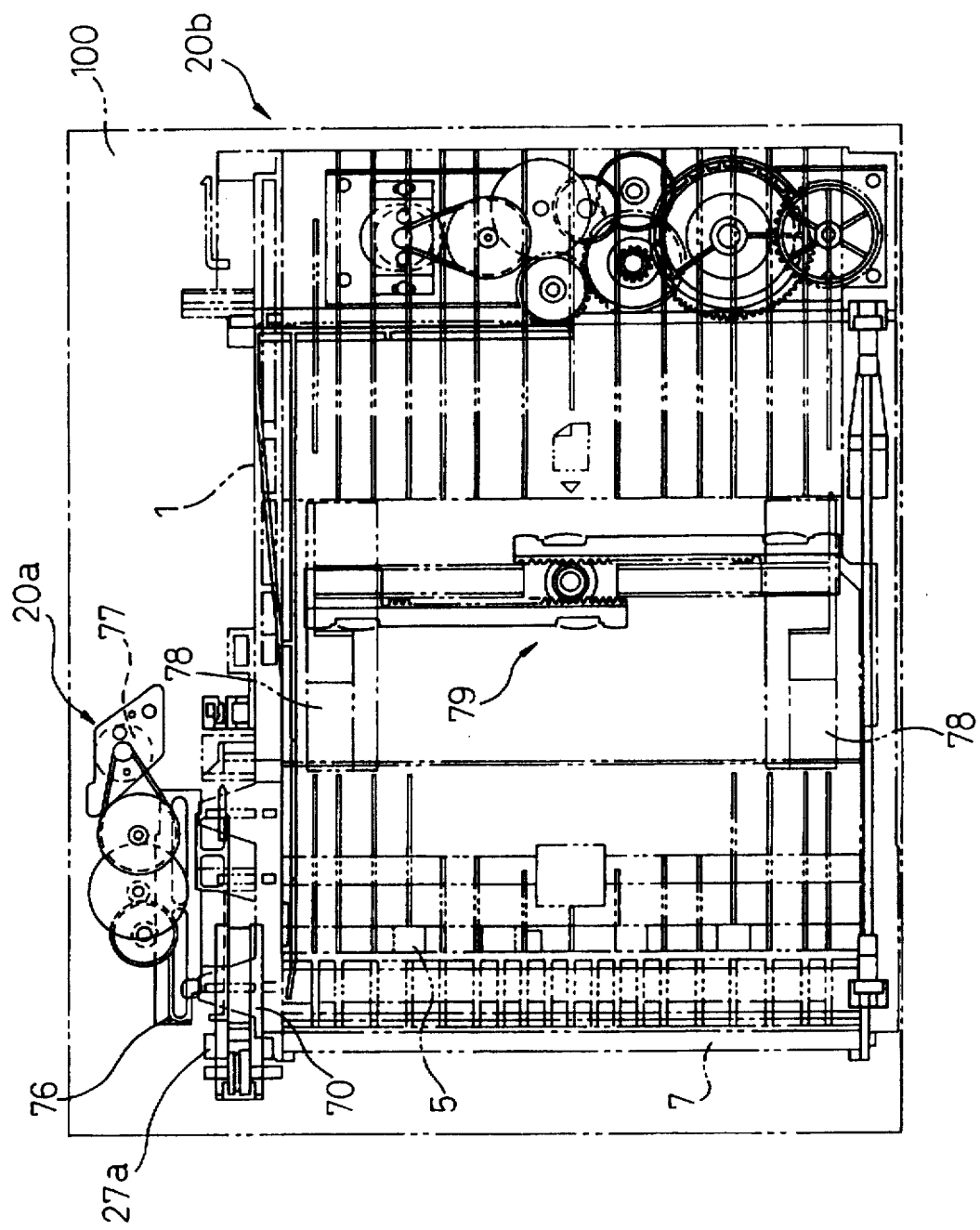
FIG. 19 is a top view of the hopper table arranged in the casing of the image reading apparatus.
Figure 20:
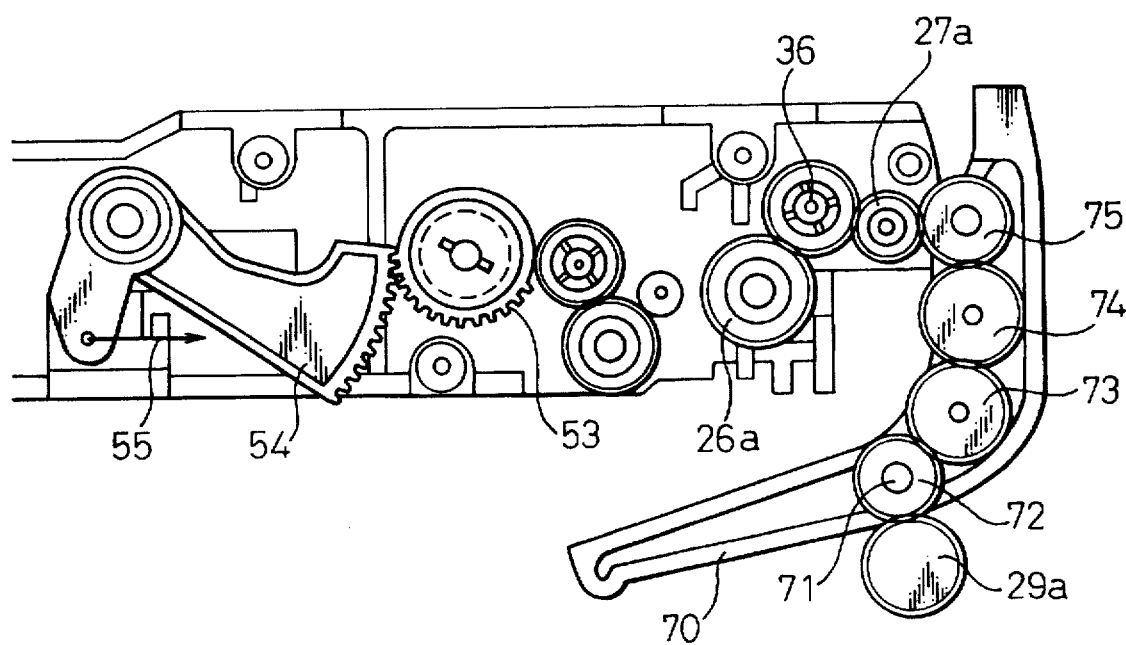
FIG. 20 is a rear view of the apparatus of FIG. 19.

FIGS. 19 and 20 show how the right gear 27a of the third conveying roller 7 of the hopper table 1 is engaged with the gear 29a of the conveying roller 9 in the casing 100 of the image reading apparatus. The conveying roller 9 is arranged in front of the stacker 2 in FIG. 2. The conveying roller 8 in FIG. 2 is cancelled in FIGS. 19 and 20.

An L-shaped support 70 is pivotally attached to the casing 100 by a pivot 71 at a position near the rear of the hopper table 1 when it is in the fully closed position in the casing 100. Gears 72 to 75 are carried by the L-shaped support 70 in series. The gear 72 is attached to the pivot 71 and normally engaged with the gear 29a of the conveying roller 9. The gear 75 can be engaged with the right gear 27a of the third conveying roller 7 of the hopper table 1. In particular, the gear 75 is engaged with the gear 27a when the L-shaped support 70 is in the position of FIG. 20, and disengaged from the gear 27a when the L-shaped support 70 is rotated in the clockwise direction in FIG. 20.

The L-shaped support 70 is connected to a rack plate 77 which is moved by a motor 77, with pulleys and gears (including a pinion) arranged between the motor 77 and the rack plate 76. Therefore, the L-shaped support 70 can be moved so that the gear 75 is disengaged from the gear 27a to thereby allow the gear 29a to be disengaged from the gears of the hopper table 1 when the hopper table 1 is drawn into the open position, and so that the gear 75 is engaged with the gear 27a to thereby allow the gear 29a to be engaged with the gears of the hopper table 1 when the hopper table 1 is fully inserted into the closed position. FIG. 19 also shows movable side guides 78 to guide the documents on the hopper 1a, and a loading mechanism 20b by which the hopper table 1 can be moved.

I claim:

1. A sheet conveying device comprising:

feeding means for feeding a sheet to a sheet conveying path, wherein said feeding means comprises a pick roller for picking up said sheet from a hopper to feed said sheet to said sheet conveying path;

conveying means for conveying said sheet fed by said feeding means, wherein said sheet conveying path is formed between said conveying means and said feeding means;

an actuator for driving said feeding means and said conveying means; and movement transferring means arranged such that a movement transferring means driving force is transferred from said actuator to said feeding means when said actuator is actuated in a first direction and said movement transferring means driving force is not transferred from said actuator to said feeding means when said actuator is actuated in a second direction, whereby a movement of said feeding means is controlled by controlling an actuating direction of said actuator; and means for lifting said pick roller comprising:

a driving source generating a pick roller lifting means driving force for rotationally driving at least said pick up roller;

a first shaft rotationally driven by said driving source to rotate said pick roller;

a first gear attached to said first shaft such that said first gear is rotated in a third direction when said first shaft rotates in said third direction and said pick roller lifting means driving force is not transmitted to said first gear when said first shaft does not rotate in said third direction;

an arm for lifting said pick roller;

a second shaft having said arm attached thereto for lifting and lowering said arm;

a second gear attached to said second shaft for engagement with said first gear to transmit said pick roller lifting means driving force to said second shaft depending upon a rotation of said first gear; and an elastic member for urging said second gear in a fourth direction by which said pick roller is lifted, wherein said arm is lowered when said first gear rotates in said third direction and said arm is lifted by an urging force of said elastic member when said driving force is not transmitted to said first gear.

2. The sheet conveying device according to claim 1, wherein said movement transferring means further comprises at least one one-way clutch for transferring said movement transferring means driving force from said actuator to any one of said feeding means and said conveying means.

3. A sheet conveying device comprising:

feeding means for feeding a sheet to a sheet conveying path, wherein said feeding means comprises a pick roller for picking up said sheet from a hopper to feed said sheet to said sheet conveying path;

conveying means for conveying said sheet fed by said feeding means, wherein said sheet conveying path is formed between said conveying means and said feeding means;

an actuator for driving said feeding means and said conveying means; and movement transferring means arranged such that a movement transferring means driving force is transferred from said actuator to said feeding means and to said conveying means when said actuator is actuated in a first direction and said movement transferring means driving force is not transferred from said actuator to said feeding means, but is transferred to said conveying means when said actuator is actuated in a second direction; and means for lifting said pick roller comprising:

a driving source generating a pick roller lifting means driving force for rotationally driving at least said pick up roller;

a first shaft rotationally driven by said driving source to rotate said pick roller;

a first gear attached to said first shaft such that said first gear is rotated in a third direction when said first shaft rotates in said third direction and said pick roller lifting means driving force is not transmitted to said first gear when said first shaft does not rotate in said third direction;

an arm for lifting said pick roller;

a second shaft having said arm attached thereto for lifting and lowering said arm;

a second gear attached to said second shaft for engagement with said first gear to transmit said pick roller lifting means driving force to said second shaft depending upon a rotation of said first gear; and an elastic member for urging said second gear in a fourth direction by which said pick roller is lifted, wherein said arm is lowered when said first gear rotates in said third direction and said arm is lifted by an urging force of said elastic member when said driving force is not transmitted to said first gear.

4. The sheet conveying device according to claim 3, wherein said movement transferring means further comprises at least one one-way clutch for transferring said movement transferring means driving force from said actuator to any one of said feeding means and said conveying means.

5. A data processing apparatus comprising:

a hopper for setting sheets thereon;

a stacker;

data processing means;

a pick roller for picking up said sheets from said hopper to feed said sheets to a sheet conveying path;

at least one conveying roller, wherein said at least one conveying roller and said pick roller have said sheet conveying path therebetween;

a motor for driving said pick roller and said at least one conveying roller; and movement transferring means for transferring a movement transferring means driving force of said motor to said pick roller and said at least one conveying roller, said movement transferring means including at least one one-way clutch for transferring said movement transferring means driving force of said motor to any one of said pick roller and said at least one conveying roller; and means for lifting said pick roller comprising:

a driving source generating a pick roller lifting means driving force for rotationally driving at least said pick up roller;

a first shaft rotationally driven by said driving source to rotate said pick roller;

a first gear attached to said first shaft such that said first gear is rotated in a third direction when said first shaft rotates in said third direction and said pick roller lifting means driving force is not transmitted to said first gear when said first shaft does not rotate in said third direction;

an arm for lifting said pick roller:

a second shaft having said arm attached thereto for lifting and lowering said arm;

a second gear attached to said second shaft for engagement with said first gear to transmit said pick roller lifting means driving force to said second shaft depending upon a rotation of said first gear; and an elastic member for urging said second gear in a fourth direction by which said pick roller is lifted wherein said arm is lowered when said first gear rotates in said third direction and said arm is lifted by an urging force of said elastic member when said driving force is not transmitted to said first gear.

6. A data processing apparatus comprising:

a hopper for setting sheets thereon;

a stacker;

data processing means;

a pick roller for picking up said sheets from said hopper to feed said sheets to a sheet conveying path;

at least one conveying roller, wherein said at least one conveying roller and said pick roller have therebetween said sheet conveying path;

a motor for driving said pick roller and said at least one conveying roller; and movement transferring means for transferring a movement transferring means driving force of said motor to said pick roller and said at least one conveying roller, said movement transferring means including at least two one-way clutches arranged such that said movement transferring means driving force is transferred from said motor to said pick roller and to said at least one conveying roller when said motor is actuated in a first direction and said movement transferring means driving force is not transferred from said motor to said pick roller, but is transferred to said at least one conveying roller when said actuator is actuated in a second direction; and means for lifting said pick roller comprising:

a driving source generating a pick roller lifting means driving force for rotationally driving at least said pick up roller;

a first shaft rotationally driven by said driving source to rotate said pick roller;

a first gear attached to said first shaft such that said first gear is rotated in a third direction when said first shaft rotates in said third direction and said pick roller lifting means driving force is not transmitted to said first gear when said first shaft does not rotate in said third direction;

an arm for lifting said pick roller;

a second shaft having said arm attached thereto for lifting and lowering said arm;

a second gear attached to said second shaft for engagement with said first gear to transmit said pick roller lifting means driving force to said second shaft depending upon a rotation of said first gear; and an elastic member for urging said second gear in a fourth direction by which said pick roller is lifted, wherein said arm is lowered when said first gear rotates in said third direction and said arm is lifted by an urging force of said elastic member when said driving force is not transmitted to said first gear.

7. A data processing apparatus comprising:

a casing having a first cavity and a second cavity arranged in a vertically spaced relationship;

a hopper table drawably arranged in said first cavity, said hopper table having a hopper for setting sheets thereon;

said second cavity being a stacker;

data processing means arranged in said hopper table;

a pick roller attached to a pick roller shaft for picking up said sheets from said hopper to feed said sheets to a sheet conveying path;

a separator roller attached to a separator roller shaft;

at least one conveying roller attached to at least one conveying roller shaft, wherein said at least one conveying roller, said pick roller and said separator roller have therebetween said sheet conveying path from said hopper to said stacker;

a motor for driving said pick roller, said separator roller and said at least one conveying roller;

movement transferring means for transferring a driving force of said motor to said pick roller, said separator roller and said at least one conveying roller, said movement transferring means comprising:

first transferring means operably connecting said at least one conveying roller shaft to said motor;

a first one-way clutch associated with said first transferring means;

second transferring means operably connecting said separator roller shaft to said at least one conveying roller shaft;

a second one-way clutch associated with said second transferring means;

third transferring means operably connecting said separator roller shaft to said at least one conveying roller shaft;

a third one-way clutch associated with said second transferring means and functioning in an opposite sense to said second one-way clutch;

fourth transferring means operably connecting said pick roller shaft to said separator roller shaft;

whereby said driving force is transferred from said motor to said separator roller and to said at least one conveying roller when said motor is actuated in a first direction and said driving force is not transferred from said motor to said separator roller with said pick roller, but is transferred to said at least one conveying roller when said actuator is actuated in a second direction.

8. The data processing apparatus according to claim 7, wherein said first to third transferring means comprise a gear transferring mechanism, and said fourth transferring means comprise a belt transferring means.

9. The data processing apparatus according to claim 8, wherein said first one-way clutch is arranged between said at least one conveying roller shaft and a gear in said first transferring means, said second one-way clutch is arranged between said separator roller shaft and a gear in said second transferring means, and said third one-way clutch is arranged between said separator roller shaft and a gear in said third transferring means.

10. The data processing apparatus according to claim 9, wherein said first one-way clutch is arranged on a first end of said at least one conveying roller shaft, said second one-way clutch is arranged on a first end of said separator roller shaft, and said third one-way clutch is arranged on a second end of said separator roller shaft.

11. The data processing apparatus according to claim 10, wherein said at least one conveying roller comprises a plurality of conveying rollers attached to respective conveying roller shafts and interconnected by a further gear transferring mechanism, said first one-way clutch being arranged on one of said at least one conveying roller shafts located near said separator roller.

12. The data processing apparatus according to claim 11, further comprising means for lifting said pick roller such that said pick roller is lowered when said motor is actuated in said first direction and said pick roller is lifted when said motor is actuated in said second direction.

13. The data processing apparatus according to claim 7, wherein said data processing means comprises any one of a reading head and a printing head.

14. A sheet conveying apparatus comprising:

feeding means comprising a pick roller for picking up sheets from a hopper and feeding said sheets to a sheet conveying path;

a motor for driving at least said feed roller;

movement transferring means for transferring a movement transferring means driving force of said motor to said pick roller; and means for lifting said pick roller comprising:
a driving source generating a pick roller lifting means driving force for rotationally driving at least said pick up roller;
a first shaft rotationally driven by said driving source to rotate said pick roller;

a first gear attached to said first shaft such that said first gear is rotated in a first direction when said first shaft rotates in said first direction and said pick roller lifting means driving force is not transmitted to said first gear when said first shaft does not rotate in said first direction;

an arm for lifting said pick roller;

a second shaft having said arm attached thereto for lifting and lowering said arm;

a second gear attached to said second shaft for engagement with said first gear to transmit said pick roller lifting means driving force to said second shaft depending upon a rotation of said first gear; and an elastic member for urging said second gear in a second direction by which said pick roller is lifted, wherein said arm is lowered when said first gear rotates in said first direction and said arm is lifted by an urging force of said elastic member when said driving force is not transmitted to said first gear.

15. The sheet conveying apparatus according to claim 14, wherein said movement transferring means further comprises at least one one-way clutch for transferring said movement transferring means driving force from said motor to said pick roller.

16. A data processing apparatus comprising:

a pick roller attached to a pick roller shaft for picking up a sheet from a hopper to feed said sheet to a sheet conveying path;

a second shaft arranged parallel to said pick roller shaft;

at least one arm having a first end attached to said pick roller shaft and a second arm attached to said second shaft, said at least one arm being rotatable about an axis of said second shaft;

a motor for driving at least said pick roller;

movement transferring means for transferring a movement transferring means driving force of said motor to said pick roller; and means for lifting said pick roller comprising:
a driving source generating a pick roller lifting means driving force for rotationally driving at least said pick up roller;
a first shaft rotationally driven by said driving source to rotate said pick roller;
a first gear attached to said first shaft such that said first gear is rotated in a first direction when said first shaft rotates in said first direction and said pick roller lifting means driving force is not transmitted to said first gear when said first shaft does not rotate in said first direction;

an arm for lifting said pick roller;

a second shaft having said arm attached thereto for lifting and lowering said arm;

a second gear attached to said second shaft for engagement with said first gear to transmit said pick roller lifting means driving force to said second shaft depending upon a rotation of said first gear; and an elastic member for urging said second gear in a second direction by which said pick roller is lifted, wherein said arm is lowered when said first gear rotates in said first direction and said arm is lifted by an urging force of said elastic member when said driving force is not transmitted to said first gear.

17. The data processing apparatus according to claim 16, wherein said movement transferring means further comprises at least one one-way clutch for transferring said movement transferring means driving force from said motor to said pick roller.

18. A data processing apparatus comprising:

a hopper for setting sheets thereon;

a stacker;

data processing means;

a pick roller attached to a pick roller shaft for picking up said sheets from said hopper to feed said sheets to a sheet conveying path;

a separator roller attached to a separator roller shaft;

at least one conveying roller attached to at least one conveying roller shaft, wherein a sheet conveying path is formed between said at least one conveying roller, said pick roller and said separator roller;

a motor for driving said pick roller, said separator roller and said at least one conveying roller;

movement transferring means for transferring a driving force of said motor to said pick roller, said separator roller and said at least one conveying roller; and means for lifting said pick roller comprising:

a driving source generating a pick roller lifting means driving force for rotationally driving at least said pick up roller;

a first shaft rotationally driven by said driving source to rotate said pick roller;

a first gear attached to said first shaft such that said first gear is rotated in a first direction when said first shaft rotates in said first direction and said pick roller lifting means driving force is not transmitted to said first gear when said first shaft does not rotate in said first direction;

an arm for lifting said pick roller;

a second shaft having said arm attached thereto for lifting and lowering said arm;

a second gear attached to said second shaft for engagement with said first gear to transmit said pick roller lifting means driving force to said second shaft depending upon a rotation of said first gear; and an elastic member for urging said second gear in a second direction by which said pick roller is lifted, wherein said arm is lowered when said first gear rotates in said first direction and said arm is lifted by an urging force of said elastic member when said driving force is not transmitted to said first gear.

19. The data processing apparatus according to claim 18, wherein said movement transferring means further comprises at least one one-way clutch for transferring said movement transferring means driving force from said motor to any one of said pick roller and said conveying roller.

20. A data processing apparatus comprising:

a casing having a first cavity and a second cavity arranged in a vertically spaced relationship;

a hopper table drawably arranged in said first cavity, said hopper table having a hopper for setting sheets thereon;

said second cavity being a stacker;

data processing means arranged in said hopper table;

a pick roller attached to a pick roller shaft for picking up said sheets from said hopper to feed said sheets to a sheet conveying path;

a separator roller attached to a separator roller shaft;

at least one conveying roller attached to at least one conveying roller shaft, wherein said at least one conveying roller, said pick roller and said separator roller have said sheet conveying path therebetween;

a motor for driving said pick roller, said separator roller and said at least one conveying roller;

movement transferring means for transferring a movement transferring means driving force of said motor to said pick roller, said separator roller and said at least one conveying roller; and means for lifting said pick roller comprising:

a driving source generating a pick roller lifting means driving force for rotationally driving at least said pick up roller;

a first shaft rotationally driven by said driving source to rotate said pick roller;

a first gear attached to said first shaft such that said first gear is rotated in a first direction when said first shaft rotates in said first direction and said pick roller lifting means driving force is not transmitted to said first gear when said first shaft does not rotate in said first direction;

a plurality of arms for lifting said pick roller;

a second shaft having at least one arm of said plurality of arms attached thereto for lifting and lowering said at least one arm of said plurality of arms;

a second gear attached to said second shaft for engagement with said first gear to transmit said pick roller lifting means driving force to said second shaft depending upon a rotation of said first gear; and an elastic member for urging said second gear in a second direction by which said pick roller is lifted, wherein said at least one arm of said plurality of arms is lowered when said first gear rotates in said first direction and said at least one arm of said plurality of arms is lifted by an urging force of said elastic member when said driving force is not transmitted to said first gear.

21. The data processing apparatus according to claim 20, wherein said plurality of arms and said second shaft of said pick roller lifting means further comprise:

at least one first arm having a first end attached to said pick roller shaft and a second end attached to said separator roller shaft, said at least one first arm being rotatable about an axis of said separator roller shaft;

at least one second arm having a first end engagable with said at least one first arm and a second end attached to a shaft extending parallel to said pick roller shaft, said at least one second arm being rotatable about an axis of said shaft;

a first spring for biasing said at least one second arm in a third direction in which said at least one second arm is engaged with said at least one first arm and said pick roller is lifted; and means for moving said at least one second arm in a fourth direction in which said at least one second arm is disengaged from said at least one first arm and said pick roller is lowered.

22. The data processing apparatus according to claim 21, wherein said means for moving said second arm comprises:

a first gear attached to said separator roller shaft;

a second gear attached to a shaft to which said second arm is attached; and a torque limiter arranged on said separator roller shaft, said torque limiter functioning at a certain stop torque when said separator roller shaft rotates in said second direction.

23. The data processing apparatus according to claim 22, wherein at least one of said first and second gears comprises a partially toothed gear.

24. The data processing apparatus according to claim 22, further comprising a second spring for biasing said pick roller into contact with a sheet of said sheets.

25. The data processing apparatus according to claim 20, wherein said movement transferring means further comprises at least one one-way clutch for transferring said movement transferring means driving force from said motor to any one of said pick roller and said conveying roller.

26. A data processing apparatus comprising:

a hopper for setting sheets thereon;

a stacker;

data processing means;

a pick roller for picking up said sheets from said hopper to feed said sheets to a sheet conveying path;

at least one conveying roller, wherein said sheet conveying path is formed between said at least one conveying roller and said pick roller;

an actuator for driving said pick roller and said at least one carrying roller;

control means for controlling said actuator so that said actuator is driven with a first speed while said pick roller feeds said sheets and said actuator is driven with a second speed higher than said first speed while said at least one conveying roller conveys said sheets with said pick roller in a non-operative condition; and means for lifting said pick roller comprising:

a driving source generating a pick roller lifting means driving force for rotationally driving at least said pick up roller;

a first shaft rotationally driven by said driving source to rotate said pick roller;

a first gear attached to said first shaft such that said first gear is rotated in a first direction when said first shaft rotates in said first direction and said pick roller lifting means driving force is not transmitted to said first gear when said first shaft does not rotate in said first direction;

an arm for lifting said pick roller;

a second shaft having said arm attached thereto for lifting and lowering said arm;

a second gear attached to said second shaft for engagement with said first gear to transmit said pick roller lifting means driving force to said second shaft depending upon a rotation of said first gear; and an elastic member for urging said second gear in a second direction by which said pick roller is lifted, wherein said arm is lowered when said first gear rotates in said first direction and said arm is lifted by an urging force of said elastic member when said driving force is not transmitted to said first gear.

27. The data processing apparatus according to claim 26, wherein said actuator is driven in a third direction while said pick roller feeds said sheets and said actuator is driven in a fourth direction while said at least one conveying roller conveys said sheets with said pick roller in a non-operative condition.

28. The data processing apparatus according to claim 26, further comprising movement transferring means which includes at least one one-way clutch for transferring a movement transferring means driving force from said actuator to any one of said pick roller and said conveying roller.

* * * * *